(12) United States Patent
Tuttle

(10) Patent No.: US 6,353,167 B1
(45) Date of Patent: Mar. 5, 2002

(54) METHOD AND SYSTEM USING A COMPUTER FOR CREATING MUSIC

(75) Inventor: Raglan Tuttle, Colorado Springs, CO (US)

(73) Assignee: Raglan Productions, Inc., Colorado Springs, CO (US)

(*) Notice: Subject to any disclaimer, the term of this patent is extended or adjusted under 35 U.S.C. 154(b) by 0 days.

(21) Appl. No.: 09/465,212

(22) Filed: Dec. 15, 1999

Related U.S. Application Data

(60) Provisional application No. 60/122,551, filed on Mar. 2, 1999, and provisional application No. 60/112,877, filed on Dec. 18, 1999.

(51) Int. Cl.[7] .............................................. G09B 15/02
(52) U.S. Cl. ...................................... 84/477 R; 84/609
(58) Field of Search .......................... 84/600, 609, 649, 84/464 R, 464 A, 470 R, 477 R

(56) References Cited

U.S. PATENT DOCUMENTS

| | | | | |
|---|---|---|---|---|
| 5,153,829 A | * | 10/1992 | Furuya et al. | ........ 84/477 R X |
| 5,355,762 A | * | 10/1994 | Tabata | .......................... 84/609 |
| 5,604,322 A | * | 2/1997 | Kikuchi | .................... 84/477 R |
| 5,684,259 A | * | 11/1997 | Horii | |
| 5,690,496 A | * | 11/1997 | Kennedy | |
| 5,723,803 A | * | 3/1998 | Kurakake | |
| 5,801,694 A | * | 9/1998 | Gershen | |
| 5,824,933 A | * | 10/1998 | Gabriel | ......................... 84/609 |
| 5,889,519 A | * | 3/1999 | Boezeman et al. | |
| 5,892,507 A | * | 4/1999 | Moorby et al. | |
| 5,908,997 A | * | 6/1999 | Arnold et al. | ............. 84/478 X |
| 5,915,288 A | * | 6/1999 | Gabriel | ......................... 84/609 |
| 5,931,680 A | * | 8/1999 | Semba | .................. 84/477 R X |
| 6,031,172 A | * | 2/2000 | Papadopoulos | ........... 84/470 R |

OTHER PUBLICATIONS

"Sonic Foundry Presents ACID Music" Dec. 14, 1998.*
ACID User Manual, pp. 21–28, 1999.*

* cited by examiner

*Primary Examiner*—Jeffrey Donels
(74) *Attorney, Agent, or Firm*—Townsend and Townsend and Crew LLP

(57) ABSTRACT

A novel system and method for forming music. The system includes a variety of elements such as a user interface on a display. The user interface includes a first portion on the display for a plurality of inputs, which can be characteristics of music. These characteristics tend to be the basic elements of music such as pitch, tone, key, register, and others. The user interface also includes a second portion on the display for a patterned output. The output is representative to the inputs. The output configures the inputs in a systematic manner that allows a user to "view" the music in one easy to see display.

17 Claims, 11 Drawing Sheets

4/4 Time

8/4 Time

3/4 Time

The Tempo Ball 901 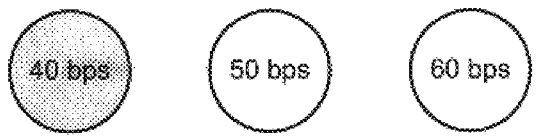
The Key Ball 903 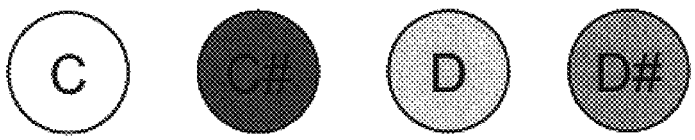
The Groove Ball (With enharmonic tone hidden) 905 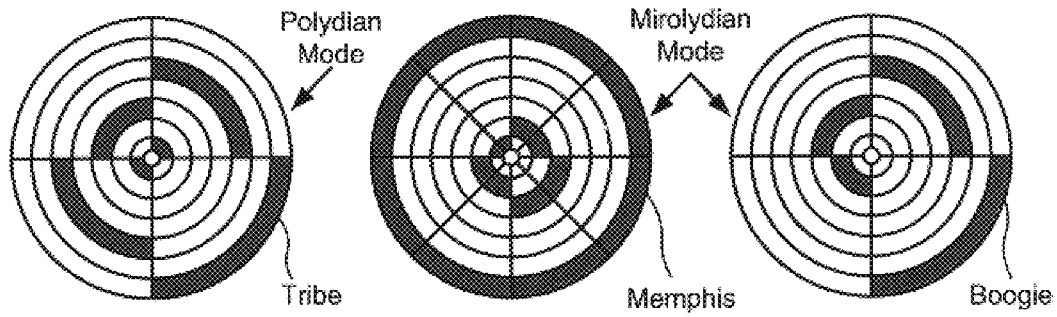
The Virtual Keyboard Ball (With enharmonic tone hidden) 907 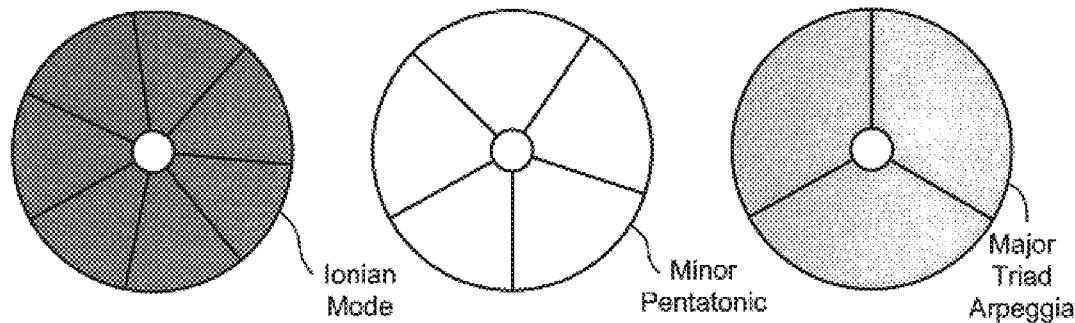
The Register Ball 909 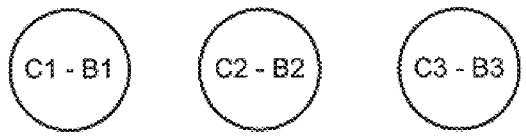
The Structure Ball 911 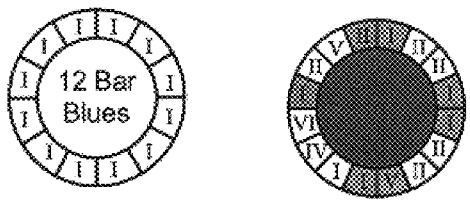
FIG. 9

Composition

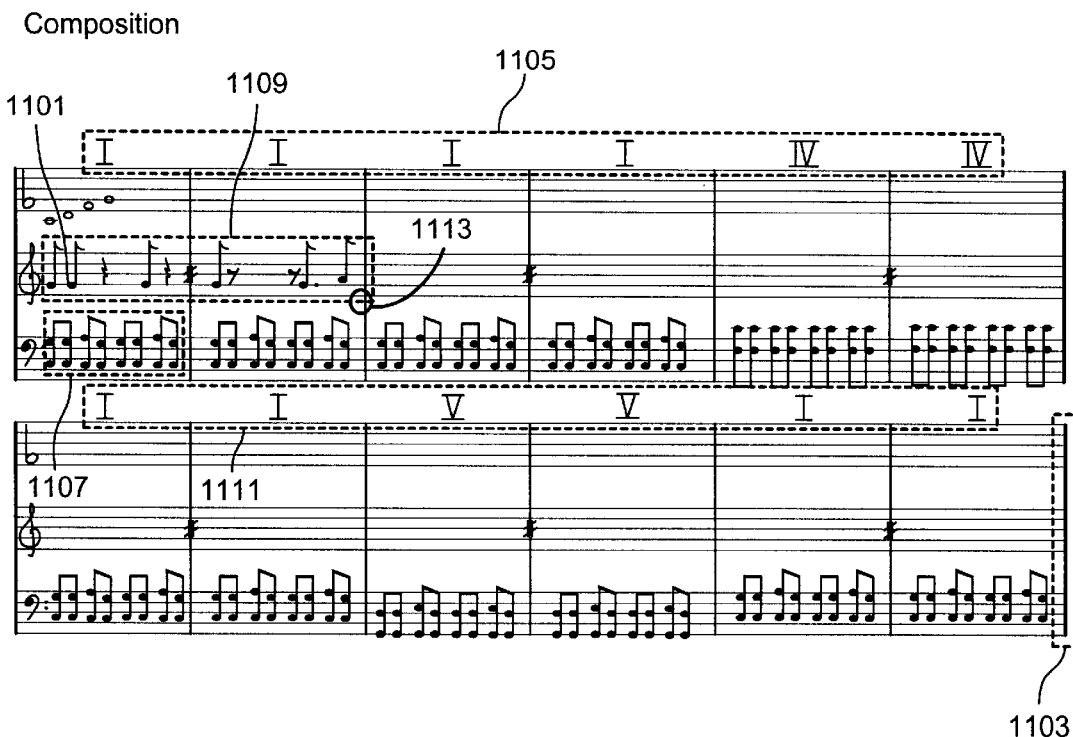

1101 —— 1) Keyball (a flat usage - Key of C)

1103 —— 2) Revolution Ball (Indicates interval for ..... - repeating....)

1105 —— 3) Structure Ball

1107 —— 4) Groove Ball (Indicates repeating pattern playing with a boogie bass.)
[Enharmonic tone hidden]

1109 —— 5) Tempo Ball ( Indicates repeating pattern.)    [Enharmonic tone hidden]

1111 —— 6) Vertical Keyboard Ball (Indicates major pentatonic scale.)

* Groove Ball #1, unlike Groove Ball #2, is adjacent to the Structure Ball and to follow the cordal pattern indicated by the Structure Ball.

** The blue section (1113) indicates a blue note or "enharmonic tone".

FIG. 11

METHOD AND SYSTEM USING A COMPUTER FOR CREATING MUSIC

CROSS REFERENCE TO RELATED APPLICATIONS

The present application claims priority to U.S. Ser. No. 60/122,551 filed Mar. 2, 1999 and U.S. Ser. No. 60/112,877 filed Dec. 18, 1999, and hereby incorporated by reference for all purposes.

COPYRIGHT NOTIFICATION

A portion of this document, such as the computer code, is subject to Copyright protection. Notice of such Copyright protection is provided herein. Applicant expressly reserves all rights subject to the extent of Copyright laws © 1999.

BACKGROUND OF THE INVENTION

The present invention relates to music theory. More particularly, the present invention provides a technique for forming music. In an exemplary embodiment, the present invention provides a method and apparatus for teaching music theory based upon an improved graphical user interface in a microprocessor based system. Merely by way of example, the present invention can be applied to a computer; but it will be recognized that the invention has a much broader range of applicability. It can be applied to computers on a wide area network such as the Internet, notebook computers, laptop computers, palmtop computers, personal digital assistants, and the like.

A variety of techniques have been proposed for teaching and creating music. A classical and most often used method relies upon teaching a student via a keyboard using simple songs and playing simple scales and chords. As merely an example, a beginning piano student often learns how to play piano by playing via a keyboard simple songs such as "Marry Had a Little Lamb" or Fur Elise by Bethoven The beginning piano student also learns how to play chords and scales, as well. For example, the student may learn how to play a C major scale and others. Over time, the student progresses and learns how to play more advanced scales, songs, and the like. In most cases, however, the student often fails to learn details of music theory and the like to create his or her own music by simple keyboard instruction.

There have been some other techniques to teach music students the theory of music. These techniques often come in the form of college or graduate school education. An example of one of these techniques is the use of visual aids in order to replace keyboard instructions. U.S. Pat. No. 4,887,507, which is in the name of Terrance Shaw (herein "Shaw"), describes a visual technique for teaching music. Shaw generally describes a complex mechanical device with moving wheels and a base member. Although somewhat effective, Shaw still fails to provide an easy way for an average music student to learn and create music.

From the above, it is seem that a technique for understanding and/or forming music that is easy to implement is highly desired.

SUMMARY OF THE INVENTION

According to the present invention, a technique including a method and apparatus for forming music is provided. In an exemplary embodiment, the present invention provides a method and apparatus for teaching music theory based upon an improved graphical user interface in a microprocessor based system. The microprocessor based system includes, among others, computers on a wide area network such as the Internet, notebook computers, laptop computers, palmtop computers, personal digital assistants, and the like. Signal processing can also occur in the computer.

In a specific embodiment, the present invention provides a novel system for forming music. The system includes a variety of elements such as a graphical user interface on a display. The user interface includes a first portion on the display for a plurality of inputs, which can be characteristics of music. These characteristics tend to be the basic elements of music such as pitch, tone, key, register, and other parameters that define music. The user interface also includes a second portion on the display for a patterned output. The output is representative to the inputs. The output configures the inputs in a systematic manner that allows a user to "view" the music in one easy to see display. Additionally, the patterned output is coupled to underlying sounds and/or tones based upon a series of music rules. Accordingly, the present invention allows the user to play the music that is represented by the pattern, which was created by the user.

In an alternative specific embodiment, the present invention provides a method for forming music on a computer, e.g., laptop, notebook, network, and others The method includes providing a user display, where the user display has a first portion. The first portion includes one or more indications which define music characteristics. These indications can be in the form of icons or tools, for example. The music characteristics include, among others, tone, pitch, key, and register. The method includes a step of selecting one of the indications that correspond to one of the music characteristics. Selection can occur, for example, by visually selecting the indication(s) and mechanically using a mouse, keyboard, or other input device for electronically selecting one or more of the indications. The method also includes placing the selected indication on a second portion of the display. In some embodiments, the second portion of the display is called a palette, which can be analogized to a blank piece of paper for a drawing. The icons representing the music characteristics are placed on the palette using, for example, a drag and drop technique of the mouse, but is not limited to this technique. Here, the user can rely on his or her own creativity in properly selecting one or more of the music characteristics to define his or her music. Once one or a set of characteristics are selected, the method plays the music, which is based upon the characteristics. The user can listen to the music, which has been created by the present user display.

Numerous benefits are achieved by way of the present invention. Depending upon the embodiment, one or more of these benefits can be present. In one aspect, the present invention provides an easy to use software interface for teaching and creating music. Additionally, the present invention provides a patterned output that can define the music in a spatial and graphical form. The patterned output can be played in the form of audio output in some embodiments to allow the user to listen to the newly formed music. The present invention can be implemented on conventional hardware such as a personal computer and the like. These and other benefits are described throughout the present specification and more particularly below.

The present invention achieves these benefits in the context of known process technology. However, a further understanding of the nature and advantages of the present invention may be realized by reference to the latter portions of the specification and attached drawings.

BRIEF DESCRIPTION OF THE DRAWINGS

FIG. 9 is a simplified diagram of a register ball display according to an embodiment of the present invention; and FIGS. 10–13 are tone diagrams displays according to embodiments of the present invention

DESCRIPTION OF THE SPECIFIC EMBODIMENTS

According to the present invention, a technique including a method and system for forming music is provided. In an exemplary embodiment, the present invention provides a method and apparatus for teaching music theory based upon an improved graphical user interface ("GUI") in a microprocessor based system. The microprocessor based system can be a computer, a workstation, a network computer, a portable computer, a notebook computer, a palmtop computer, and other interface devices.

Figure 1:
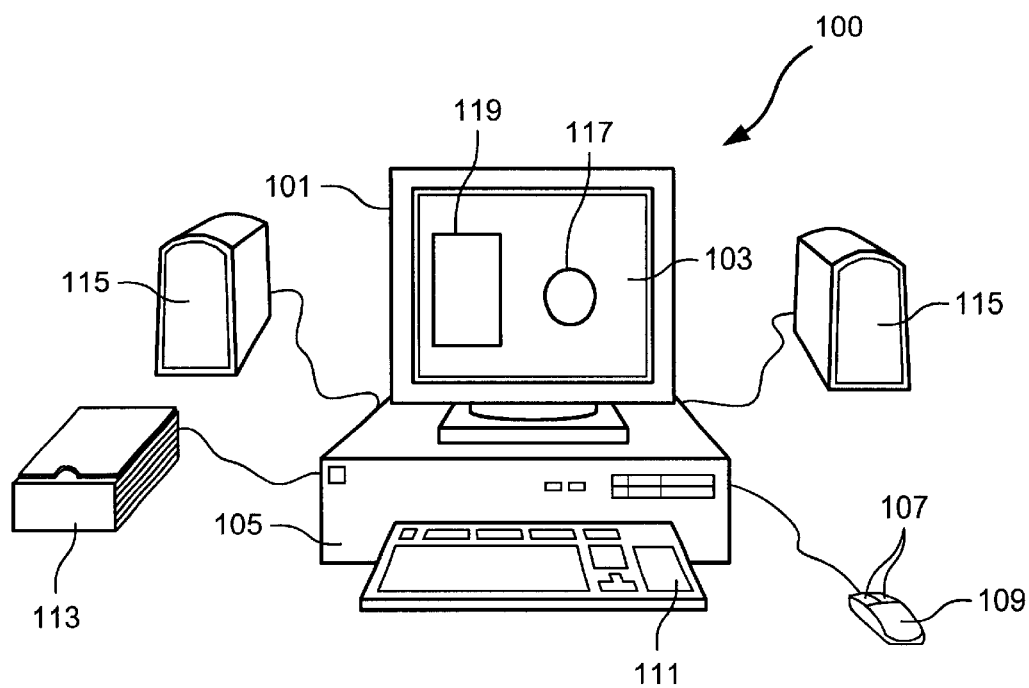
FIGS. 1–2 are simplified system diagrams according to embodiments of the present invention.

FIG. 1 is a simplified diagram of a system according to an embodiment of the present invention. This diagram is merely an example and should not limit the scope of the claims herein. One of ordinary skill in the art would recognize other variations, modifications, and alternatives. The system 100 includes a variety of elements such as a display device 101, a display screen 103, a cabinet 105, a keyboard 111, a high capacity memory device 113, a set of speakers 115, and a mouse 109. The mouse and keyboard illustrate "user input devices." Mouse 109 also has a right click button and left click button 107, which are used in the present invention. Other examples of user input devices are a touch screen, light pen, track ball, data glove, speech recognition unit, and the like. The display also has graphical user interface device 119, which is an input screen, and user device 117, which is an output screen. The input screen is actually a tool or selection menu. In one embodiment, the input screen can be similar to a keyboard or considered as a "virtual keyboard," which is used to input selected music information. The music information is used to understand and form music, for example. The output screen is an output based upon the input screen according to the present invention. The output screen visually displays patterns associated with the resulting music, which is based, in part, on the input or inputs. Further details of the input and output are shown below.

The PC based system includes a PENTIUM™ Microprocessor by Intel Corporation of Santa Clara, Calif. The system also runs a Windows™ based operating system. Alternatively, the system can be from Apple$^R$ of Cupertino, Calif., which runs an Apple$^R$ operating system. Other systems such as those that are PC based, as well as NT based, and the like can also be used. The present system is not intended to limit the scope of the claims herein, but requires a suitable amount of memory and processing power to carry out one or more of the embodiments of the present invention.

Figure 2:
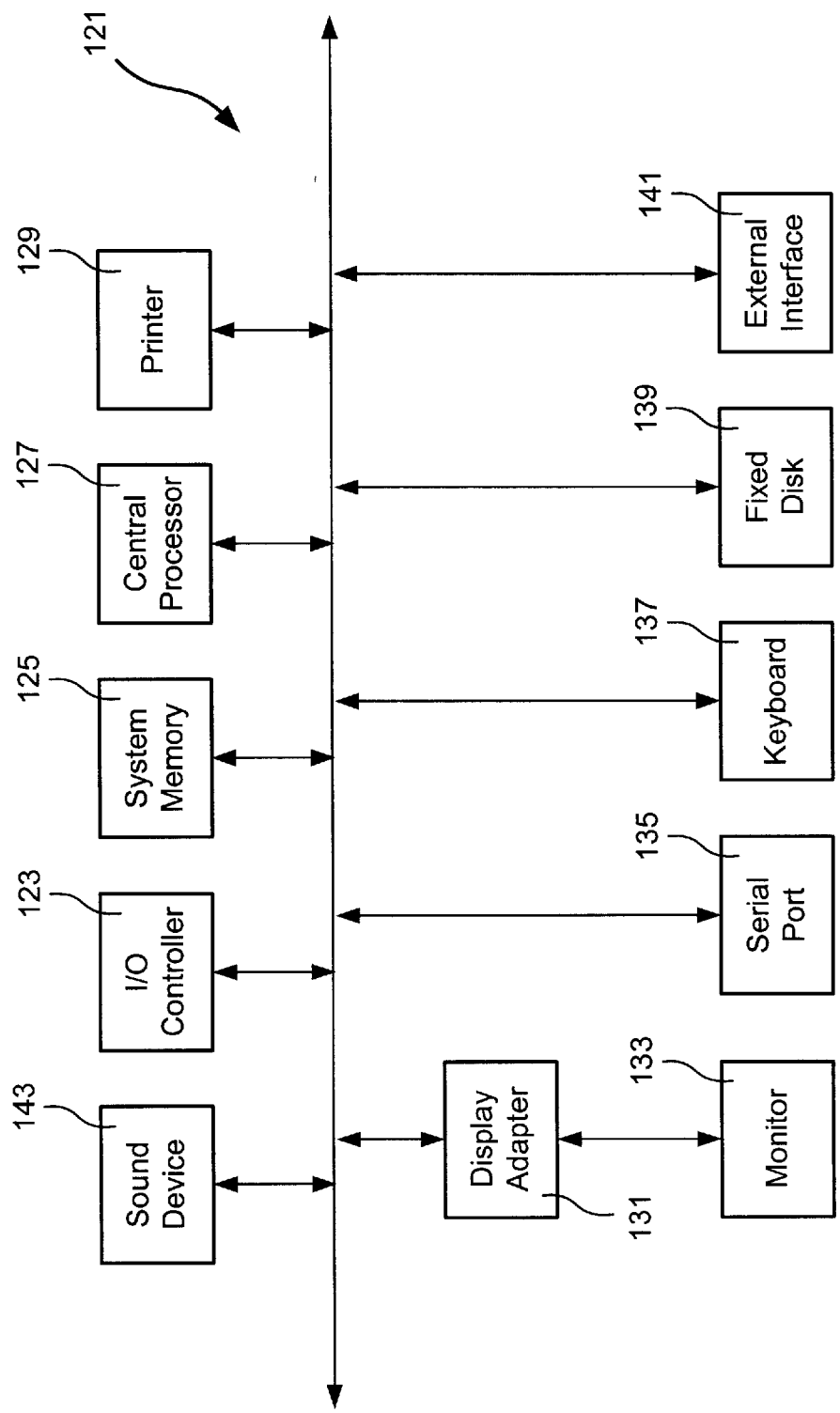

FIG. 2 is a simplified diagram of sub-systems in the system of FIG. 1 according to an embodiment of the present invention. This diagram is merely an example and should not limit the scope of the claims herein. One of ordinary skill in the art would recognize other variations, modifications, and alternatives. Among others, the sub-systems in the system include, for example, a common bus 121, an I/O controller 123, a system memory 125, a central processor 127, a printer 129, a display adapter 131, a monitor 133, a serial port 135, a keyboard 137, a fixed disk 139, an external interface 141, and other elements. The sub-systems also include a sound device 143, such as a sound card or integrated circuit chip, which is coupled to audio output devices. The audio output devices can be any suitable speakers or the like. In some embodiments, the sub-system also includes a digital signal processor or DSP integrated circuit chip to edit and configure sounds.

In a specific embodiment, the sound device includes an audio processor. The audio processor takes information from the inputs on the user display, and converts the inputs via music rules to sounds. The sounds are made by way of calls to an operating system, which, in turn, drives the audio processor and outputs the sounds, which are based upon the music rules and inputs from the user interface. The audio processor can be in the form of hardware. Alternatively, it can be in the form of software. Still further, it can be in the form of a combination of hardware and software, depending upon the application. As merely an example, the computer can output sounds and connect to other devices using a standard Musical Instrument Digital Interface, which is commonly called MIDI.

Figure 1A:
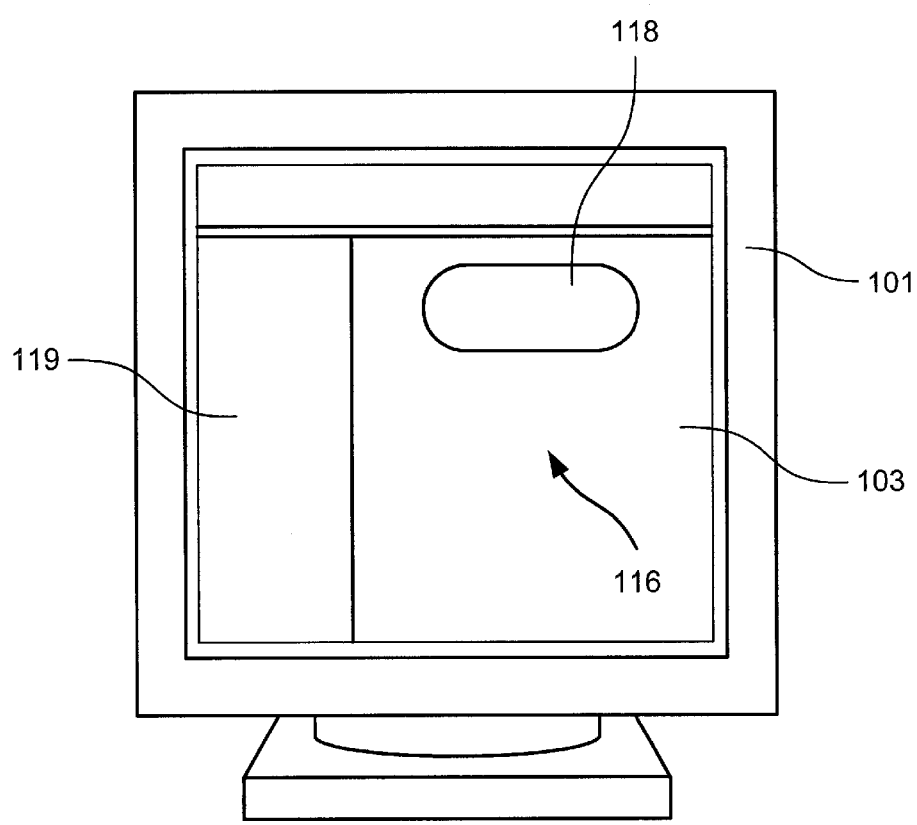

FIG. 1A is a more detailed diagram of a display 101 according to an embodiment of the present invention. This diagram is merely an example and should not limit the scope of the claims herein. One of ordinary skill in the art would recognize other variations, modifications, and alternatives. Some reference numerals used in FIG. 1A are similar to the ones used above for cross-referencing purposes. As shown, display 101 has graphical user interface device 119, which is an input screen, and user device, which is an output screen. The input screen is actually a tool or selection menu. In one embodiment, the input screen can be similar to a keyboard or considered as a "virtual keyboard," which is used to input or choose selected music information. The music information is used to understand and form music, for example. The virtual keyboard can be in the form of icons or other indications, which can be selected. Examples of the input screen are shown in more detail below.

The output screen 116 is an output based upon the input screen according to the present invention. The output screen visually displays patterns associated with the resulting music, which is based, in part, on the input or inputs. The output screen can be similar to a work space or an area where music information is accumulated to form music. Once selected music information is placed on the output screen. The music is composed and can be played by selecting one of many controls on screen portion 118. Further details of the output are shown below.

In one embodiment, a user selects music information from screen portion 119. The music information includes, tone, key, structure, and others. In one aspect, the user clicks onto an icon for the desired music information from screen portion 119 and drags the icon into screen portion 116. Other icons that correspond to other music information can also be selected. Once all the selections have been made, the user music is composed. The user can play the music by selecting one of the control keys in screen portion 118. These and other operations can be made by way of the present invention.

The present system can be replaced, in part, by other hardware. The hardware can be more integrated or even separated. The computer system can also include other types of computers such as a workstation, a network computer, a portable computer, a notebook computer, a palmtop computer, and other computing devices. These devices would include a novel program and graphical user interface or virtual keyboard according to one of more embodiments of the present invention. The FIGS. below describe additional details with regard to the present invention.

Figure 3:
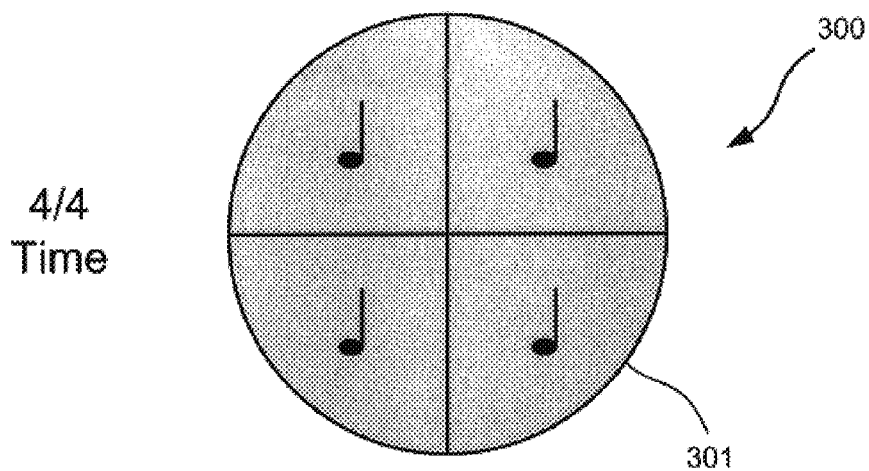
FIGS. 3–5 are simplified diagrams of displays of rhythmic elements according to embodiments of the present invention.
Figure 4:
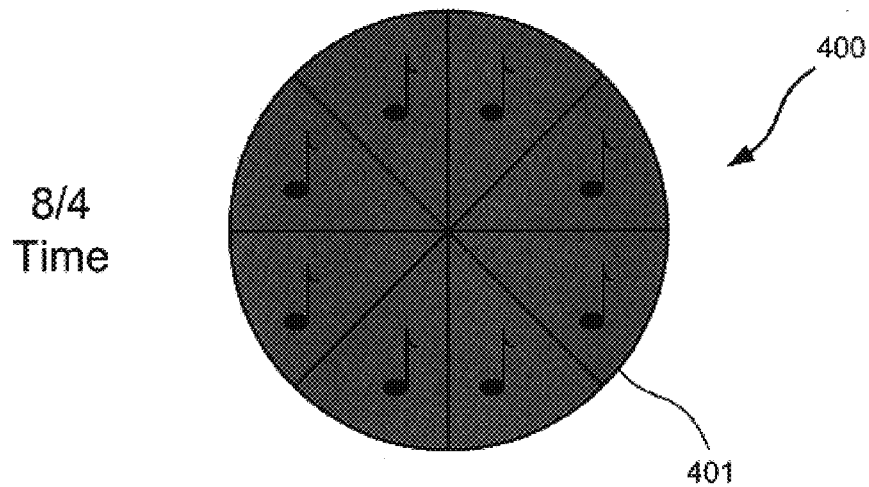
Figure 5:
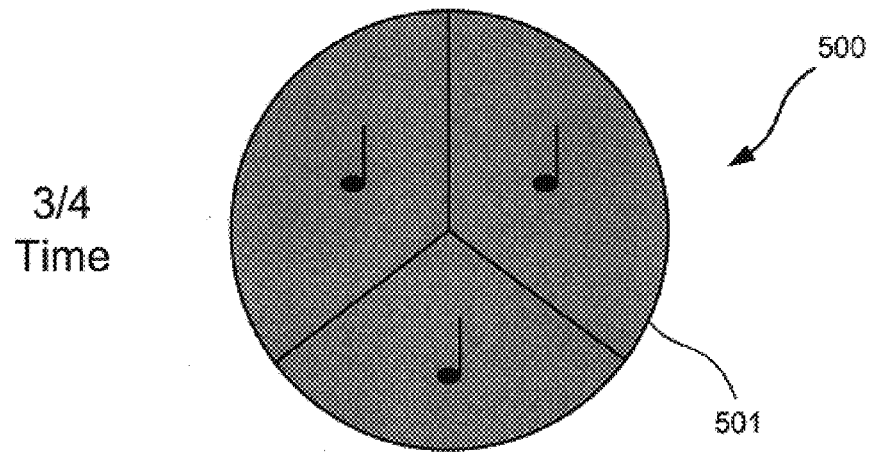

FIGS. 3–5 are simplified diagrams of rhythmic elements for screen displays according to embodiments of the present invention. These diagrams are merely examples and should not limit the scope of the claims herein. One of ordinary skill in the art would recognize other variations, modifications, and alternatives. As merely an example, the present invention, which is also called the Ragzbol™ notation system, divides rhythmic elements such as tempo, for example. One of a plurality of tempos is placed in a graphical user interface form, which can be accessed via keyboard or mouse, as well as other devices. By way of clicking on one of the tempos, the present system outputs such tempo in an audio manner through a speaker, for example. The user interface can be shaped as a disk 300 sliced into four equal sections 301. The disk 300 represents four quarter notes. Such a disc would equal four quarter notes or one measure when in 4/4 time. A disc 400 divided into eight equal sections 401 would represent eight eighth notes. One revolution of such a disc would also equal one measure when in 4/4 time. A disc 500 divided into 3 equal sections 501 would represent three quarter notes or one measure in 3/4 time. Other examples such as 2/4 time, and others can also be represented as a disk or other graphical form, e.g., polygon.

Figure 6:
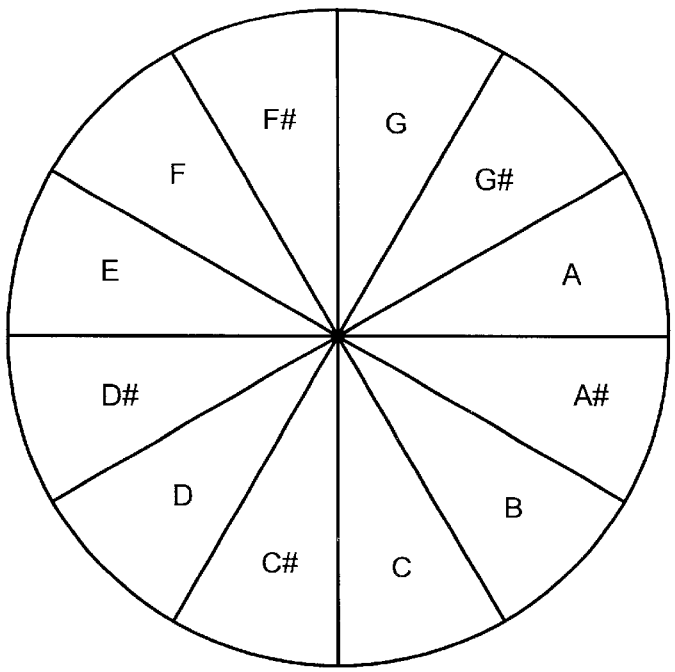
FIGS. 6–8 are simplified diagrams of displays of tones according to embodiments of the present invention.
Figure 7:
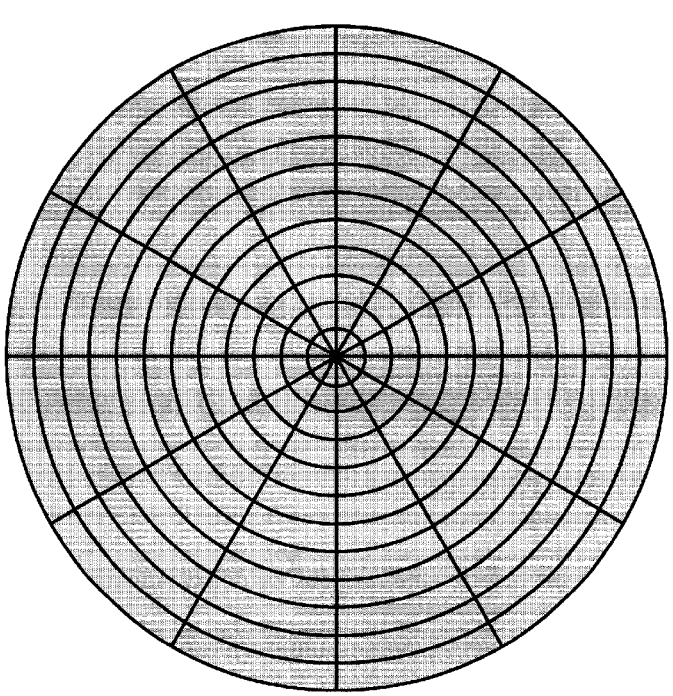

FIGS. 6–7 are simplified diagrams of screen displays for pitch according to embodiments of the present invention. These diagrams are merely examples and should not limit the scope of the claims herein. One of ordinary skill in the art would recognize other variations, modifications, and alternatives. The present pitch diagrams can be represented in one of many ways. In one embodiment, the present user interface can be divided into sections in a similar manner as in the above paragraph. Accordingly, pitch can be represented in a disk 600, 700. Such disk 600 can be divided into twelve ("12") equal sections such as these shown in the pie-like configuration. Each section represents a pitch, e.g., A, A#, B, B#, C, C#, D, D#, E, F, F#, G, G#, which forms one set of keys on, for example, a keyboard similar to a piano. The twelve sections also represent the twelve ("12") notes of western music's tonal system.

Figure 6A:
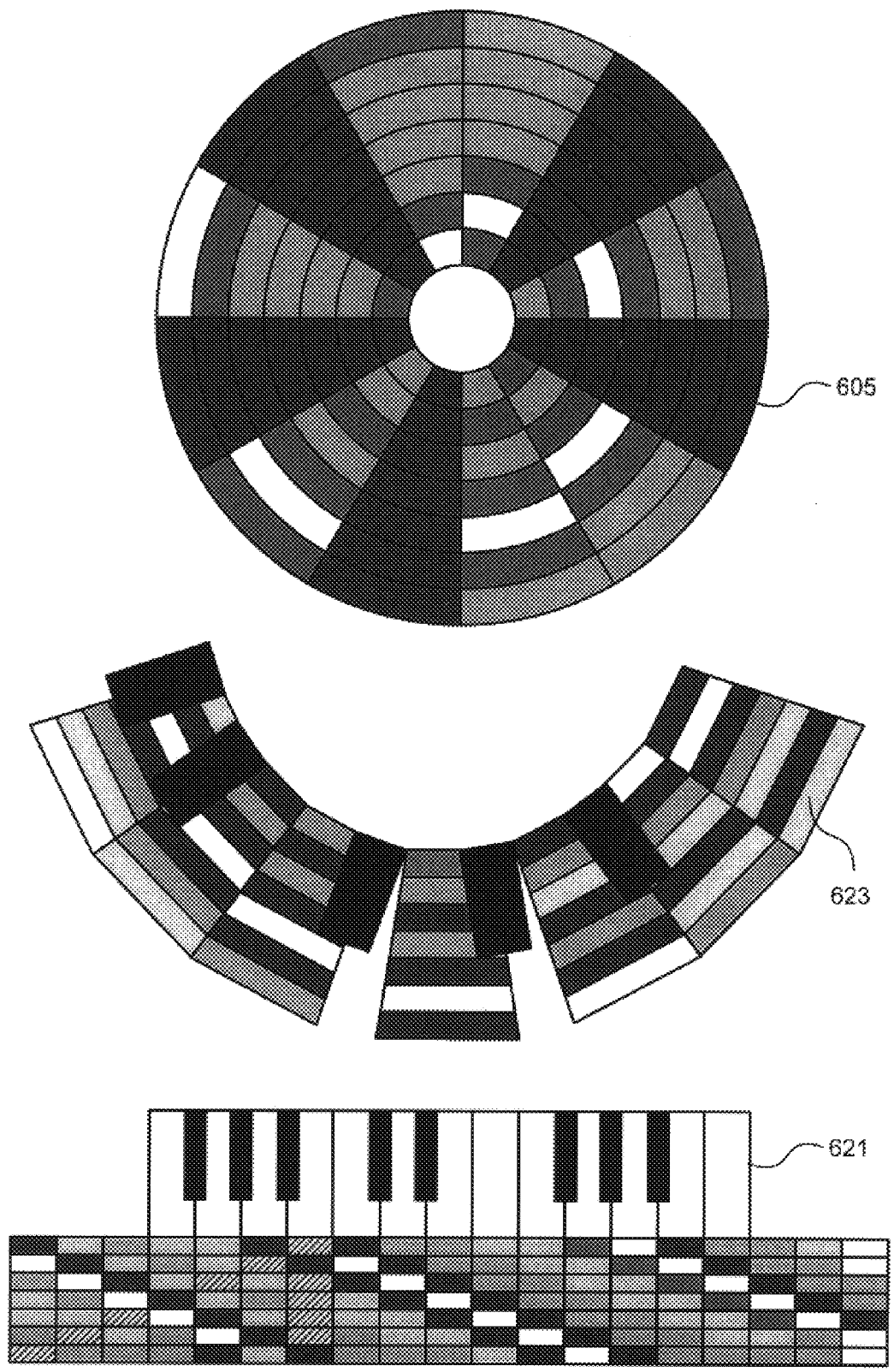

To fully illustrate, for example, the diagram of FIG. 6, it may assist the reader to review FIG. 6A. Here, a register of a standard piano keyboard 601 is shown. The standard piano keyboard includes white keys, which represent each full note, e.g., A, B, C, D, E, F, G. The black keys represent half steps, including A#, B#, C#, D#, F# and G#. These keys are folded toward each other in a circular configuration such as the folded structure 603, which has each end of the register closing in on each other. Once the circular configuration ends are attached to each other 605, twelve keys are shown in a circular arrangement. These keys include A, A#, B, B#, C, C#, D, D#, E, F, F#, G, G#. The representation of FIG. 6A should assist the reader in deriving the structure of FIG. 6, for example, as well as other FIGS. herein.

In an alternative embodiment, rhythm and pitch can be represented on a single disk 700, such as the one shown in FIG. 7. The disk illustrates a combination of rhythm and pitch in a graphical manner. As merely an example, disc 700 can be sliced into 12 equal sections similar to the sections in the above FIG. Additionally, the disk is further divided about a center region in a concentric manner. Each region has a different radius about the same center point. A radius of either 1, 2, 3, 4, 5, 6, 7, 8, 9, 10, 11, and 12 units respectively would represent the twelve ("12") notes of western music and also four beats of "swinging" eighth notes. In other embodiments, a register is also provided in combination with rhythm and pitch.

Figure 8:
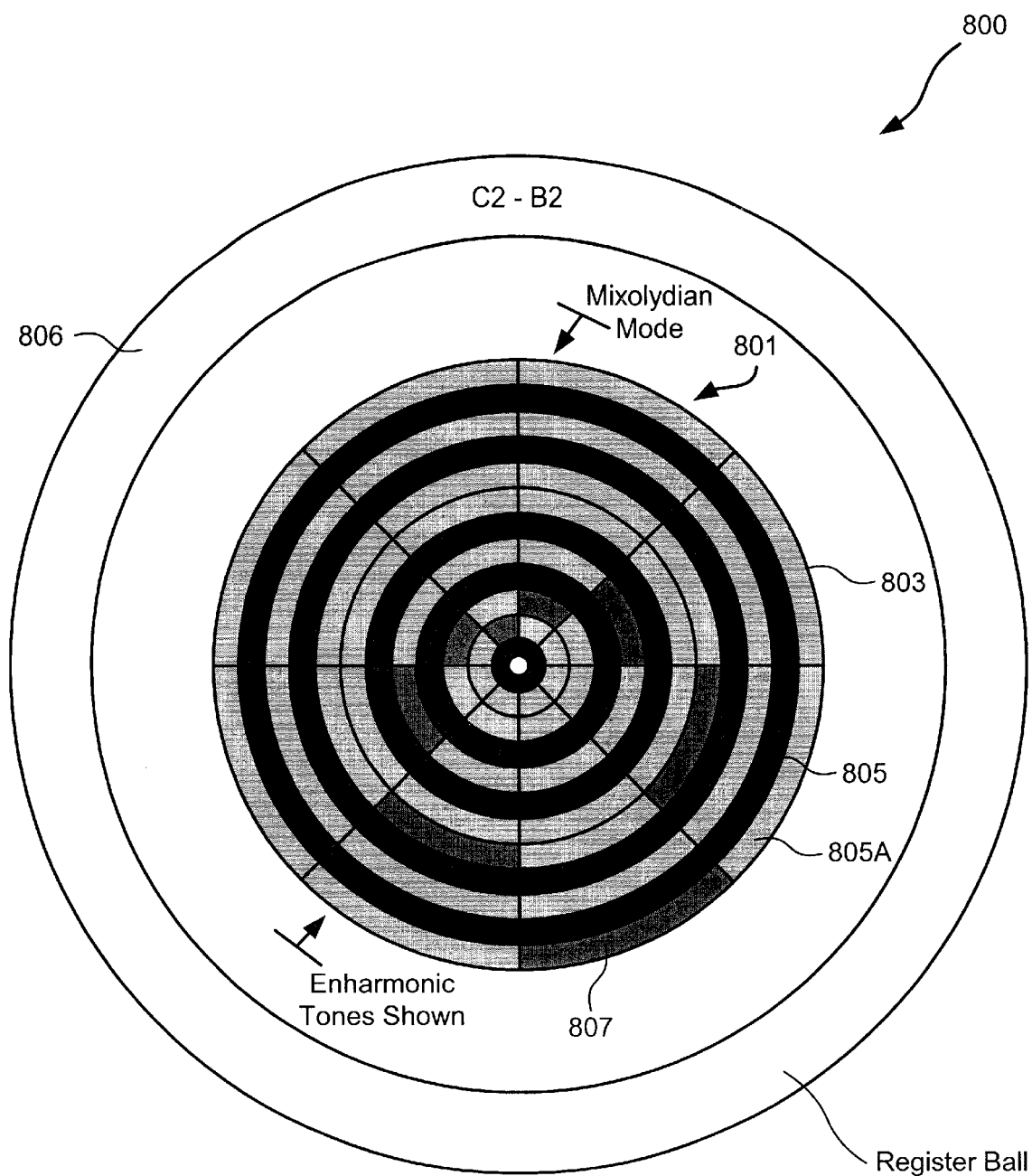

FIG. 8 is a simplified diagram 800 of a display of a register ball according to an embodiment of the present invention. This diagram is merely an illustration and should not limit the scope of the claims herein. One of ordinary skill in the art would recognize other variations, alternatives, and modifications. The present register ball 800 includes a center disk 801, which is divided in a manner similar to the FIGS. above, but is not limited. The center disk is divided into twelve pie-like 803 sections about a center region of the disk. Additionally, the center disk is divided concentrically about a center region into twelve concentric regions, each having a larger radius. In the center disk, the red portions 807 designate the key, which repeats about the tone. The tone is placed between C2 and B2 using the red portions, where the black portions 805 represent black keys and the blue portions 805A represent the white keys.

A larger annular region 806 is formed concentrically around the center disk. The larger annular region designates a register. Here, a "Boogie-Woogie" base-line played two octaves (i.e., C2–B2) below middle C is depicted. Outer annular region 806 designates a register about middle C, where position does not matter. Alternatively, the outer annular region can be placed in an inner region of the disk 801.

FIG. 9 is a simplified diagram of an input device according to an embodiment of the present invention. The input device is used for programming purposes, for example. The input device also can be used for teaching purposes, for example. The input device can be used in combination with the keyboard or mouse or voice activated device, as well as other input means. The input device includes a variety of parameters, which can be selected, for creating and analyzing music. These parameters or elements are described in reference to the FIG.

1. The tempo ball 901 includes a collection of balls representing various tempos such as 40 bps ("beats per second"), 50 bps, 60 bps, etc. Here, the tempo could be continuous, which can be adjusted in a continuous sliding scale manner. Alternatively, the tempo could be quantized.

2. The key ball 903 is used to designate a key or tonal center. The key ball includes 12 balls representing the 12 notes of western music, e.g., C, C#, D, D#.

3. The groove ball 905 can include looping MIDI recordings of various basic piano. The ball compiles styles such as "Stride," "Shuffle," "Straight Eight Boogie," "Memphis," "Blues," and others. The duration of these recordings depends on the length of the rhythmic phrase, for instance, a Stride groove would be 4 beats in length, a Memphis groove eight beats, and Boogie-Woogie four or eight beats depending on the base line. The groove ball is the basic rhythm ball, which is similar to the rhythm ball.

4. The virtual keyboard 907 ball can be a collection of balls representing the seven modes, major and minor pentatonic scales, major and minor blues scales, arpeggios of major and minor triads, arpeggios of major and minor seventh chords, the chromatic scale, and other balls representing other simple harmonic structures, for example, Jazz musicians typically employ while improvising melodic lines in various styles. The keyboard ball represents the entire body of scale or mode, which defines a mode such as mixalidian, etc. See FIG. 13.

5. The register ball 909 can be a collection of balls representing the various registers, e.g., C1 to B1, C2 to B2, C3 to B3.

6. The structure ball 911 can be a collection of balls representing various structures typically employed in Jazz or Blues (e.g., 12 bar blues, 16 bar blues) performance. This generally describes the harmonic portion of the music, e.g., blues, jazz. One way goes in half steps, which is the standard way of going up or down the keys. The other dimension which is placed perpendicular goes up in fourth steps (perfect forth steps).

7. The duration ball designates a particular number of revolutions for the structure ball. For example, a blues composition including four choruses would employ a #4 duration ball.

The features noted above can be implemented on a portion of the display. Depending upon the embodiment, a user device such as a mouse can be used to click onto one of the features in the FIG. Alternatively, the present features can include another element such as a palette. The palette is a designated area of the display on the computer, which is used to drop one or more of the features noted. The palette is similar to "a blank sheet of paper," where a user can begin to design the music using one or more of the features noted. The user can direct a cursor to click onto one or more of the features, which are dragged and dropped onto the palette.

In a specific embodiment, the present invention uses rules to couple or connect the various features with the final output, which is in the form of a patterned disk, for example. The rules connecting the various features can be analogous to the rules connecting the various musical elements in Jazz performance. For instance, the selection of a tempo ball in which a quarter note equals 120 beats per second, sets the tempo. The ball containing the rhythmic information can rotate and perform their musical content (just as in a standard sequencing program, the selection of a tempo dictates the pace for all the other rhythmic elements of a piece of music). Also, similar to the way a Jazz performance mirrors the content of a musical chart, the patterned output maps out the harmonic information of a given performance. For example, use of a standard "12 Bar Blues Structure Ball" would mean that in bar 5 of a "Boogie-Woogie" performance the Bass would now play its repeating 4 beat pattern beginning on the fourth scale degree rather than the first.

Figure 10:
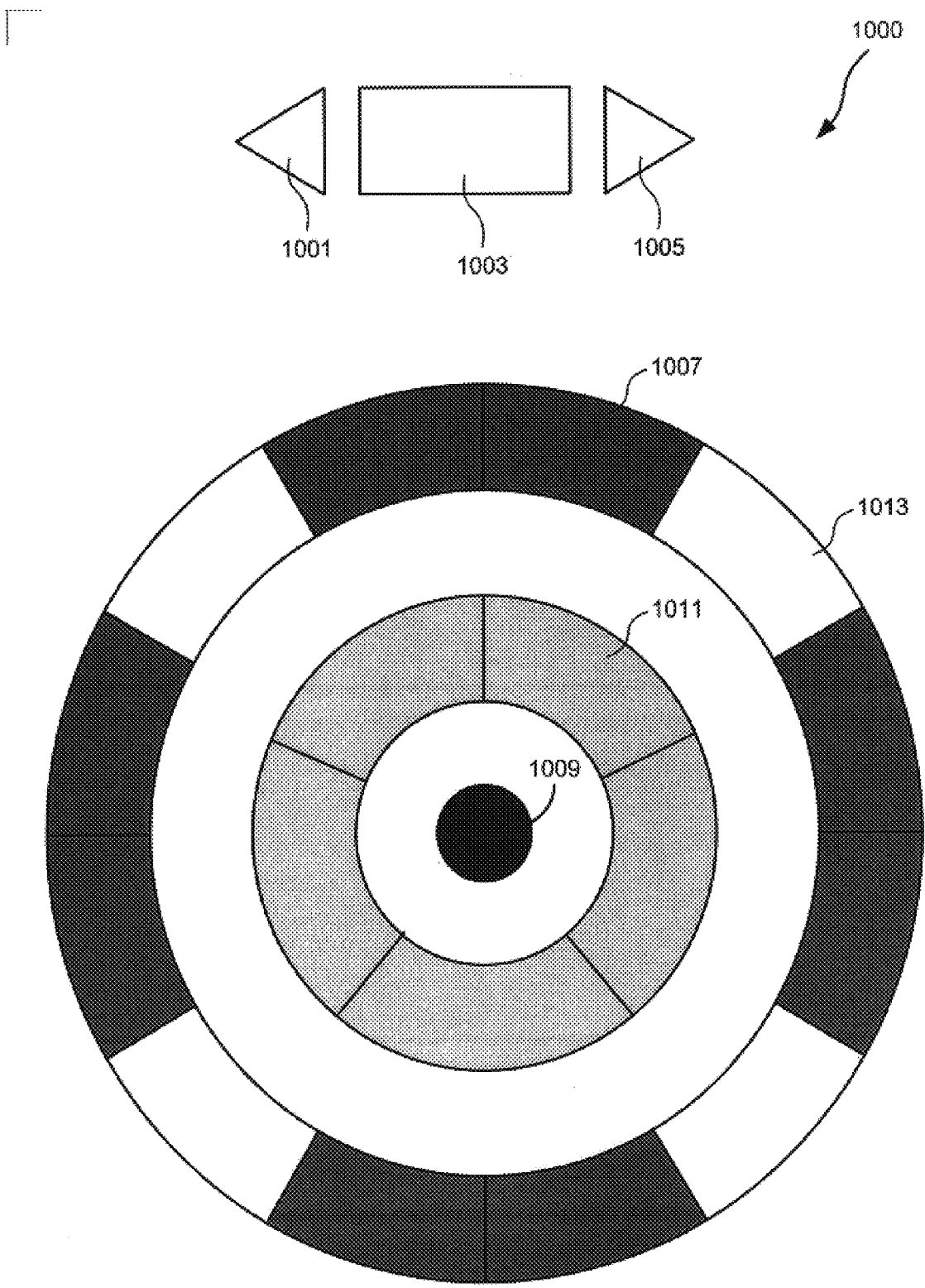

The present invention can be implemented in one or more examples. These examples, which are referenced by way of the FIGS. show the operation of embodiments of the present invention. FIG. 10 is a simplified example of a user display according to an embodiment of the present invention. This FIG. is merely an example and should not limit the scope of the claims herein. One of ordinary skill in the art would recognize other variations, modifications, and alternatives.

Referring to FIG. 10, depicted at the top of the interface are three buttons. These are, going from left to right, include recording icons rewind 1001, stop 1003, and play 1005. Below the icons is a palette region. Three features, which are depicted as icons 1007, are dragged from the features region to the palette. As shown, the outer most 1013 is a groove ball 1013. Since no structure or duration ball has been dragged onto the palette, this musical figure will continue to loop until the stop icon is clicked. Only one note is being played (since no "key" or "register" ball has been dragged onto the palette this note defaults to C2) and it is playing a swinging eight note rhythm (since no tempo ball has been dragged onto the palette this rhythm has defaulted to 120 bps).

Inside of the groove ball is the Minor Pentatonic Virtual Keyboard ball 1011 (defaulted to the key of C and register C4 since neither key nor register ball has been dragged on to palette). Moving in a clockwise direction from the section, the five sections of this ball represent the notes C, Eb, F, G, and Bb respectively. Inside of this Virtual Keyboard ball is a red dot 1009 representing the mouse pointer. Moving this pointer over one of the five sections of the virtual keyboard ball triggers whatever note that section happens to represent.

Figure 12:
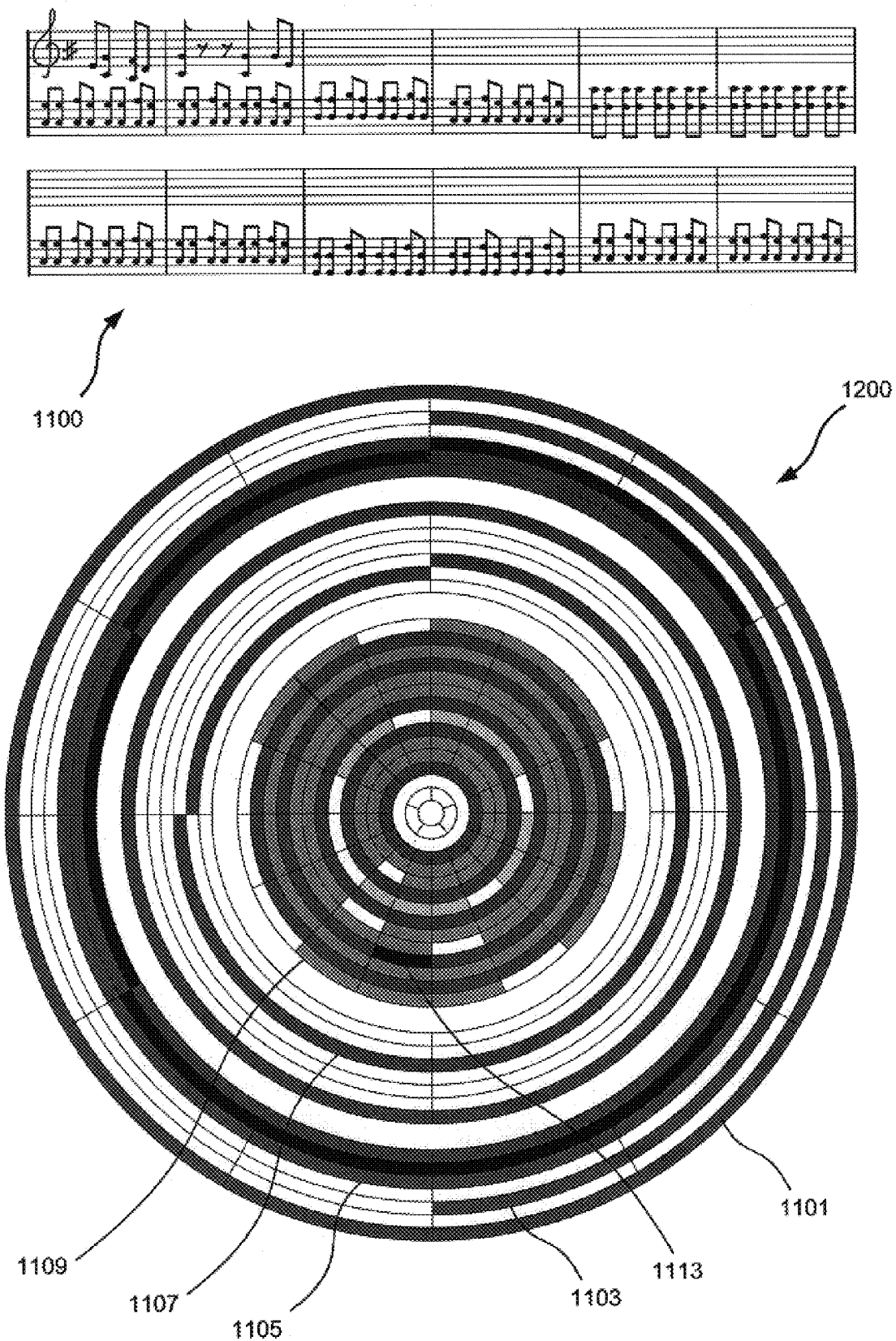

FIGS. 11–12 are simplified diagrams of other examples according to the present invention. These diagrams are merely examples and should not limit the scope of the claims herein. One of ordinary skill in the art would recognize other variations, modifications, and alternatives. FIG. 11 is a simplified example of sheet music 1100, which is typically played on a piano. For easy reading and cross-referencing, FIGS. 11–12 have been color coded. A legend for the color coding is provided in the lower portion of FIG. 11. FIG. 12 is a simplified illustration of graphical patterns 1200 according to the present invention. The graphical patterns can be displayed on a computer display. The legend describes the following layers or regions of the pattern of the FIGS.

Key ball: The key ball is shown in the color red 1101. As shown, there are no flats or sharps. The key is in C, but can be others.

Revolution ball: The revolution ball is in a combination of yellow and green colors 1103. As shown, the revolution ball shows a division of two segments, which represent two choruses.

Structure ball: The structure ball is in a combination of blue and purple colors 1105. As shown, the structure ball includes the number of bars and chords.

Groove ball (#1): The groove ball is in a combination of red and yellow colors 1107. As shown, the groove ball indicates a repeating pattern of notes that represents a Boogie Bass.

Groove ball (#2): The groove ball is in a combination of orange, red, and yellow colors 1109. As shown, the groove ball indicates a repeating pattern.

Virtual keyboard ball: The virtual keyboard ball is in a yellow color 1111. As shown, the virtual keyboard ball indicates a major pentatonic scale.

The examples shown above illustrate that sheet music can be converted into a graphical notation. Alternatively, the graphical notation, which is the pattern, could be converted into sheet music. Accordingly, the present invention can be used to analyze music, which has been converted from sheet. Alternatively, the present invention can be used to create sheet music, once a desirable music pattern is found. These and other embodiments will be recognized by one of ordinary skill in the art.

Although the above has been generally described in specific hardware and software elements, the present invention can be applied in many other ways. For example, the present invention can be applied further separated in terms of hardware and/or software. Additionally, the present invention can be applied in terms of more integrated software. Depending upon the embodiment, the present invention can also be applied in more integrated hardware such as chips, or the like.

Figure 13:
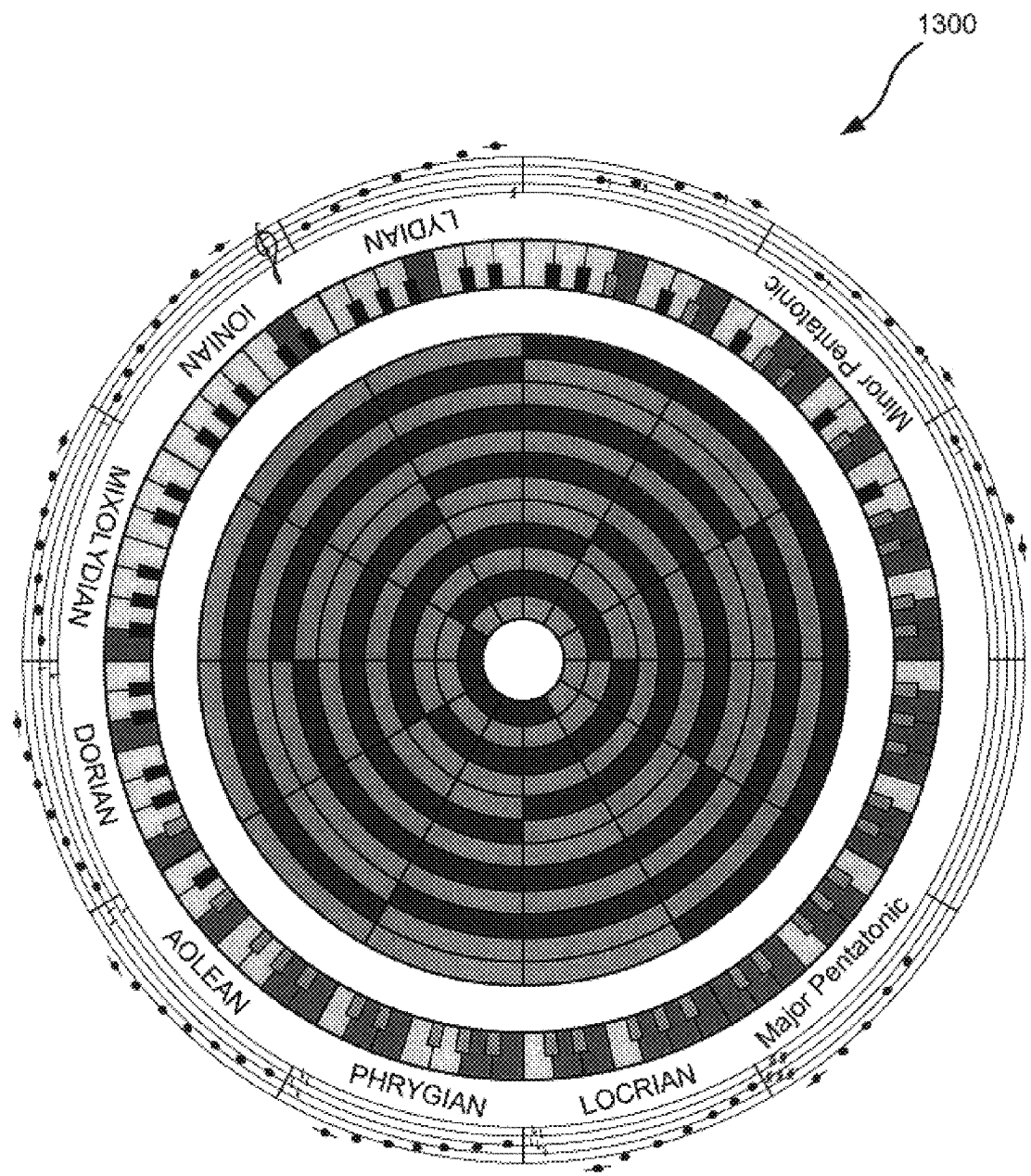

FIG. 13 is a simplified display diagram of a virtual ball 1300 according to an embodiment of the present invention. This diagram is merely an illustration and should not limit the scope of the claims herein. One of ordinary skill in the art would recognize other variations, modifications, and alternatives. The display diagram can be a collection of balls representing the seven modes 1301, major and minor pentatonic scales, major and minor blues scales, arpeggios of major and minor triads, arpeggios of major and minor seventh chords, the chromatic scale, and other balls representing other simple harmonic structures, for example, Jazz musicians typically employ while improvising melodic lines in various styles. The keyboard ball represents the entire body of scale or mode, which defines a mode such as mixalidian, etc. Although the diagram is shown in a circular arrangement, it can also be in the form of a linear arrangement, a polygon, and other shapes, as well as sizes.

EXAMPLE

To prove the principle and operation of the present invention, examples were made which implemented the present invention. Certain aspects of the present invention were implemented on a computer system. The computer system was a MacIntosh™ computer made by a company called Apple Computer, Inc. of Cupertino, Calif. The system was loaded with a computer software program called MAX from Opcode Systems Inc. The program is generally an interactive real-time graphic programming environment for multimedia applications. MAX is object oriented, and allows the user to program by way of graphical techniques. Max includes a variety of objects and features including, for example, device control (e.g., MIDI devices, CD audio), MIDI support, user interface, graphics, timing, and others. Further details of MAX can be found at http://www.opcode.com/products/max/, which is incorporated by reference herein. Aspects of the present invention were programmed using MAX. An example of computer code, which was implemented on MAX is provided below.

```
max v2;
#N vpatcher 100 46 722 466;
#P button 151 66 15 0;
#P message 608 317 23 196617 zero;
#P message 102 22 52 196617 stop;
#P message 103 1 58 196617 start 1024;
#P hidden newex 146 433 35 196617 metro;
#P hidden toggle 121 392 15 0;
#P hidden button -31 459 15 0;
#N vpatcher 635 450 638 478;
#P outlet 182 629 15 0;
#P newex 48 290 105 196617 if $i1==0 then set 1;
#P user uslider 35 39 18 128 13 1 0 0;
#P comment 240 603 100 196617 Out to Movie "Next";
#P comment 240 66 100 196617 Inlet from Seq MidiParse Patch Change #;
#P comment 224 123 100 196617 Patch #;
#P button 558 281 15 0;
#P button 205 284 15 0;
#P button 339 287 15 0;
#P button 444 283 15 0;
#P comment 473 190 62 196617 int in left inlet selects gate outlet;
#P comment 196 40 47 196622 gate;
#P comment 53 266 100 196617 BASIC is the default;
#P comment 192 311 100 196617 MIXOLYDIAN;
#P comment 850 537 100 196617 IONIAN;
#P comment 730 539 100 196617 LYDIAN;
#P comment 626 542 100 196617 PENT 5;
#P comment 511 541 100 196617 PENT 4;
#P comment 392 544 100 196617 PENT 3;
#P comment 285 544 100 196617 PENT 2;
#P comment 774 305 100 196617 PENT 1;
#P comment 649 306 100 196617 LOCRIAN;
#P comment 532 309 100 196617 PHRYGIAN;
#P comment 419 309 100 196617 AOLEAN;
#P comment 301 310 100 196617 DORIAN;
#P button 786 281005 0;
#P button 668 286 15 0;
#P button 512 521 15 0;
#P button 403 523 15 0;
#P button 291 523 15 0;
#P button 624 520 15 0;
#P button 853 514 15 0;
#P button 737 516 15 0;
#P number 223 141 35 9 0 0 0 3;
#P inlet 220 77 15 0;
#P newex 646 259 105 196617 if $i1==5 then set 1;
#P newex 404 257 105 196617 if $i1==3 then set 1;
#P newex 292 260 105 196617 if $i1==2 then set 1;
#P newex 182 262 105 196617 if $i1==1 then set 1;
#P newex 283 497 105 196617 if $i1==7 then set 1;
#P newex 758 258 105 196617 if $i1==6 then set 1;
#P newex 393 495 105 196617 if $i1==8 then set 1;
#P newex 500 492 105 196617 if $i1==9 then set 1;
#P newex 531 258 105 196617 if $i1==4 then set 1;
#P newex 724 484 111 196617 if $i1==11 then set 1;
#P newex 608 490 111 196617 if $i1==10 then set 1;
#P newex 844 480 111 196617 if $i1==12 then set 1;
#P outlet 200 631 15 0;
#P outlet 224 630 15 0;
#P outlet 244 631 15 0;
#P outlet 276 631 15 0;
#P outlet 303 626 15 0;
#P outlet 329 622 15 0;
#P outlet 357 621 15 0;
#P outlet 387 617 15 0;
#P outlet 410 617 15 0;
#P outlet 435 615 15 0;
#P outlet 459 615 15 0;
#P outlet 478 618 15 0;
#P connect 24 0 56 0;
#P connect 25 0 57 0;
#P connect 25 0 20 0;
#P connect 57 0 58 0;
#P connect 20 0 11 0;
#P connect 20 0 51 0;
#P connect 56 0 25 0;
#P connect 21 0 10 0;
#P connect 22 0 9 0;
#P connect 15 0 8 0;
#P connect 25 0 19 0;
#P connect 19 0 29 0;
#P connect 25 0 21 0;
#P connect 23 0 7 0;
#P connect 18 0 6 0;
#P connect 21 0 50 0;
```

P connect 19 0 5 0;
P connect 17 0 4 0;
P connect 25 0 17 0;
P connect 17 0 30 0;
P connect 25 0 22 0;
P connect 16 0 3 0;
P connect 13 0 2 0;
P connect 22 0 49 0;
P connect 14 0 1 0;
P connect 12 0 0 0;
P connect 25 0 16 0;
P connect 16 0 31 0;
P connect 25 0 15 0;
P connect 15 0 52 0;
P connect 25 0 13 0;
P connect 13 0 28 0;
P connect 25 0 23 0;
P connect 23 0 32 0;
P connect 25 0 14 0;
P connect 14 0 26 0;
P connect 25 0 18 0;
P connect 18 0 33 0;
P connect 25 0 12 0;
P connect 12 0 27 0;
P pop;
P hidden newobj −33 112 187 196617 patcher MODE;
N vpatcher 83 120 615 363;
P newex 127 405 41 196617 midiout;
P inlet −112 157 15 0;
P inlet −128 157 15 0;
P comment −117 32 100 196617 MIDI sequencer;
P user umenu −117 73 83 196647 1 64;
X add 'DX7 II';
P newex −116 95 50 196617 midiin;
P comment −117 58 62 196617 Input device:;
P user kslider 483 328 54 0 36 48 31 12;
P number 730 426 35 9 0 0 0 3;
P number 403 426 35 9 0 0 0 3;
P newex 403 490 158 196617 noteout 1;
p newex 403 456 158 196617 makenote 80 100;
P outlet 242 433 15 0;
P number 332 396 35 9 0 0 0 3;
P message 6 120 52 196617 read;
P message 649 −33 158 1441802 play 1 2 3 4 5 6 7 8 9 10;
P comment 232 51 100 196617 MIDI sequencer;
P user umenu 354 26 83 196647 1 64;
X add 'DX7 II';
P comment 362 67 59 196617 ints interpreted as MIDI bytes;
P newex 355 48 50 196617 midiin;
P comment 354 11 62 196617 Input device:;
P hidden newex 278 14 49 196617 omsinfo;
P hidden newex 278 −26 52 196617 loadbang;
P hidden message 278 −5 64 196617 controllers;
P comment −24 239 272 196617 bang sent out right outlet when sequence comes to the end;
P button −41 238 15 0;
P comment 63 53 141 196617 'bang' to play at default speed;
P comment 63 69 194 196617 'start' (tempo) with 1024=normal speed;
P comment 63 86 124 196617 stop recording and playing;
P comment 63 103 77 196617 start recording;
P comment 63 137 140 196617 set onset delay of first event;
P comment 63 155 178 196617 print out first few events in sequence;
P comment 63 202 163 196617 save as a MIDI or text file;
P message 531 38 52 196617 read;
P newex −82 214 27 196617 seq;
P message 6 198 52 196617 write;
P comment 63 173 166 196617 read (optional filename) from a text or MIDI file;
P message 6 154 52 196617 print;
P message 6 137 52 196617 delay 0;
P message 6 103 52 196617 record;
P message 7 71 58 196617 start 1024;
P button 6 52 15 0;
P message 6 86 52 196617 stop;
P comment −37 218 224 196617 optional argument to read in a MIDI or text file;
P number −65 337 35 9 0 0 0 3;
P newex −52 560 40 196617 unpack;
P number −52 582 27 9 0 0 0 3;
P button −71 615 15 0;
P number −22 582 28 9 0 0 0 3;
P number 40 582 28 9 0 0 0 3;
P number 10 582 27 9 0 0 0 3;
P newex 10 560 40 196617 unpack;
P number 101 582 28 9 0 0 0 3;
P number 71 582 27 9 0 0 0 3;
P newex 71 560 40 196617 unpack;
P number 134 560 28 9 0 0 0 3;
P button 134 582 15 0;
P newex −52 534 340 196617 midiparse;
P number 278 560 28 9 0 0 0 3;
P button 278 582 15 0;
P number 223 560 28 9 0 0 0 3;
P button 223 582 15 0;
P button 180 582 15 0;
P number 180 560 28 9 0 0 0 3;
P comment −50 632 300 196617 Midiparse parses raw MIDI bytes into ints or lists of two ints. Each outlet is a different MIDI message type.;
P button 10 600 15 0;
P button 71 600 15 0;
P comment 25 598 47 196617 Poly Pressure;
P comment −36 599 38 196617 Note On/Off;
P comment 89 599 44 196617 Control Change;
P comment 262 599 41 196617 MIDI Channel;
P comment 178 599 34 196617 After Touch;
P comment 133 599 40 196617 Pgm Change;

P comment 221 599 32 196617 Pitch Bend;
P comment −66 514 204 196617 Separate raw MIDI bytes by message type;
P comment −64 482 83 196622 midiparse;
P message 457 60 48 1441802 first 0;
P message 461 113 40 1441802 stop;
P message 642 16 40 1441802 play;
P newex 507 177 199 1441802 mtr 10;
P color 5;
P message 481 7 55 1441802 record 3;
P number 584 294 35 9 0 0 0 3;
P comment 219 455 100 196617 Patch Changes;
P hidden fasten 78 1 77 0 −39 92 −111 92;
P connect 77 0 48 0;
P connect 68 0 48 0;
P connect 47 0 48 0;
P connect 45 0 48 0;
P connect 41 0 48 0;
P connect 44 0 48 0;
P connect 43 0 48 0;
P connect 42 0 48 0;
P connect 40 0 48 0;
P connect 80 0 48 0;
P connect 81 0 48 0;
P connect 36 0 35 0;
P connect 48 0 38 0;
P connect 38 0 25 0;
P connect 25 0 37 0;
P connect 37 0 36 0;
P connect 48 1 57 0;
P connect 37 1 34 0;
P fasten 25 1 31 0 8 556 15 556;
P connect 31 0 32 0;
P connect 32 0 17 0;
P connect 31 1 33 0;
P fasten 25 2 28 0 63 556 76 556;
P connect 28 0 29 0;
P connect 29 0 16 0;
P connect 28 1 30 0;
P connect 48 0 82 0;
P fasten 25 3 27 0 118 556 139 556;
P connect 27 0 26 0;
P fasten 25 4 19 0 173 556 185 556;
P connect 19 0 20 0;
P connect 25 5 22 0;
P connect 22 0 21 0;
P connect 25 3 70 0;
P connect 69 0 70 0;
P hidden connect 60 0 59 0;
P hidden connect 59 0 61 0;
P connect 25 6 24 0;
P connect 24 0 23 0;
P hidden connect 61 0 65 0;
P hidden fasten 65 1 63 0 432 45 360 45;
P connect 75 0 73 0;
P connect 73 0 71 0;
P connect 71 0 72 0;
P fasten 71 1 72 1 556 479 482 479;
P connect 67 0 3 0;
P connect 2 0 3 0;
P connect 49 0 3 0;
P fasten 5 0 3 0 466 133 512 133;
P fasten 6 0 3 0 462 86 512 86;
P fasten 4 0 3 0 647 109 512 109;
P connect 63 0 3 1;
P connect 63 0 3 2;
P fasten 74 0 71 2 735 450 556 450;
P connect 63 0 3 3;
P connect 3 2 1 0;
P connect 3 1 1 0;
P connect 3 0 1 0;
P connect 3 3 1 0;
P connect 3 4 1 0;
P connect 3 5 1 0;
P connect 3 6 1 0;
P connect 3 7 1 0;
P connect 3 8 1 0;
P connect 3 9 1 0;
P connect 3 10 1 0;
P pop;
P newobj 19 93 113 196617 patcher Midi Sequencer;
P hidden number 31 1116 35 9 0 0 0 3;
P hidden newex 2 1149 27 196617 +;
P hidden number 4 235 35 9 0 0 0 3;
P hidden user kslider 61 1194 54 0 48 96 31 12;
P hidden number 2 1089 35 9 0 0 0 3;
P hidden user uslider 99 1070 24 61 128 1 86 0;
N vpatcher 50 48 672 468;
P comment 294 357 164 196617 "Velocity" outputclick the mouse at different heights on each key;
P number 464 361 35 9 0 0 0 3;
P comment 175 362 100 196617 Value output;
P number 137 361 35 9 0 0 0 3;
P user kslider 137 299 54 0 36 48 31 12;
P newex 137 420 158 196617 noteout 1;
P newex 137 391 158 196617 makenote 80 100;
P comment 579 236 276 196617 reset a channel (clears notes and resets controllers). reset with no argument resets all the channels in this object;
P comment 768 210 159 196617 change to Standard Kit drum kit (try notes 36 \, 37 \, 40);
P message 700 210 65 196617 inst 1 16385;
P comment 702 146 228 196617 other messages: "controller" channel controller-number value. Send controller. Seems not to work. "knob" channel controller-number value. Send "knob." Don't know what its function is.;
P comment 673 59 142 196617 channel (for next note played);
P comment 537 59 30 196617 pitch;
P comment 612 59 45 196617 velocity;
P comment 625 39 124 196617 inlets work like "noteout";
P newex 817 50 45 196617 pack 0 0;
P newex 817 28 62 196617 random 128;

P newex 884 27 62 196617 random 128;
P newex 817 4 55 196617 metro 500;
P toggle 817 -15 15 0;
P message 629 20 45 196617 vol 1 \$1;
P number 629 -2 35 9 0 0 0 3;
P comment 678 0 118 196617 change volume on a channel—range appears to be from 0 to 1000?;
P message 531 207 35 196617 pick 1;
P message 533 237 41 196617 reset 1;
P comment 580 205 114 196617 change instrument via Instrument Picker dialog;
P number 530 159 35 9 0 0 0 3;
P message 530 181 49 196617 inst 1 \$1;
P comment 703 133 241 196617 Component $1 is the Macintosh Built-in synthesizer;
P message 530 133 43 196617 inst 1 1;
P comment 578 95 115 196617 change instrument on channel (1) to General MIDI instrument number (5). For the built-in synthesizer \, this command can not be executed in real time since the instrument is often loaded from disk.;
P message 529 102 43 196617 inst 1 5;
P comment 552 4 68 196617 play middle C;
P message 529 3 20 196617 60;
P newex 529 27 85 196617 makenote 80 400;
P comment 704 72 248 196617 arguments are a set of triples (component index \, polyphony \, instrument) for each "channel" (starting at 1) created for the object. There is no set limit on the number of channels. You can have multiple qtmusic objects too.;
P newex 529 73 161 196617 qtmusic 1 4 1;
P comment 525 -8 195 196617 Interface to Quicktime music architecture;
P comment 525 -38 66 196622 qtmusic;
P number 65 73 35 9 0 0 0 3;
P inlet 65 -16 15 0;
P connect 0 0 1 0;
P connect 1 0 36 0;
P connect 36 0 37 0;
P connect 37 0 34 0;
P connect 34 0 35 0;
P fasten 34 1 35 1 290 414 216 414;
P fasten 39 0 34 2 469 385 290 385;
P connect 36 1 39 0;
P hidden connect 25 0 6 0;
P connect 7 0 6 0;
P fasten 31 0 4 0 705 232 522 232 522 66 534 66;
P hidden connect 20 0 4 0;
P fasten 17 0 4 0 536 226 522 226 522 67 534 67;
P fasten 16 0 4 0 538 255 522 255 522 66 534 66;
P fasten 13 0 4 0 535 202 522 202 522 66 534 66;
P fasten 11 0 4 0 535 153 522 153 522 67 534 67;
P fasten 9 0 4 0 534 124 522 124 522 67 522 67 534 67;
P connect 6 0 4 0;
P connect 14 0 13 0;
P connect 19 0 20 0;
P connect 6 1 4 1;
P connect 21 0 22 0;
P connect 22 0 24 0;
P connect 24 0 25 0;
P connect 23 0 25 1;
P connect 22 0 23 0;
P pop;
P newobj 2 300 81 196617 patcher Midi out;
N vpatcher 51 40 379 478;
P message 116 95 20 196617 67;
P outlet 71 381 15 0;
P number 49 214 35 9 0 0 0 3;
P inlet 52 21 15 0;
P newex 71 278 27 196617 +;
P number 71 320 35 9 0 0 0 3;
P user hslider 147 62 18 128 128 1 0 0;
P number 148 132 35 9 0 0 0 3;
P newex 100 59 27 196617 key;
P newex 118 170 27 196617 +;
P number 131 216 35 9 0 0 0 3;
P number 101 131 35 9 0 0 0 3;
P message 95 229 20 196617 79;
P inlet 147 22 15 0;
P connect 10 0 11 0;
P connect 11 0 9 0;
P connect 9 0 8 0;
P connect 8 0 12 0;
P connect 3 0 9 1;
P connect 1 0 9 1;
P connect 13 0 2 0;
P connect 5 0 13 0;
P connect 2 0 4 0;
P connect 4 0 3 0;
P connect 6 0 4 1;
P connect 0 0 7 0;
P connect 7 0 6 0;
P pop;
P newobj 3 265 62 196617 patcher Key;
N vpatcher 50 40 638 478;
P comment -27 223 100 196617 note swap of mode order-->;
P comment 18 -331 100 196617 in from mode;
P newex 691 -541 134 196617 if $i1<==$i2/2 then set $i1;
P comment 219 84 100 196617 OUT;
P comment -20 344 100 196644 Y;
P comment 782 488 100 196644 X;
P comment 660 -410 100 196617 NOTE CROSS;
P comment 807 -642 100 196617 x/3<=y;
P comment 80 649 100 196617 Use Select To Cul Enharmonic Tones;
P comment 147 533 58 196617 Divided by 20 to get it within the range of MIDI note numbers;
P comment 303 439 73 196617 Y Coordinates;
P comment 205 444 72 196617 X Coordinates;
P comment -4 544 114 196617 The distance of the mouse from the center of the ragzbol=the square root of (the X coordinates squared plus the Y coordinates squared);
P comment 693 -674 100 196617 Mouse Coordinates;

P inlet 704 −658 15 0;
P inlet 750 −660 15 0;
P number 224 440 35 9 0 0 0 3;
P number 311 434 35 9 0 0 0 3;
P number 219 514 35 9 0 0 0 3;
P newex 211 491 140 196617 expr ($i1* * $i2)+($i3 * $i4);
P number 301 467 28 9 0 0 0 3;
P number 254 463 29 9 0 0 0 3;
P number 212 470 30 9 0 0 0 3;
P number 347 462 31 9 0 0 0 3;
P outlet 326 80 15 0;
P newex 219 569 27 196617 /;
P number 218 590 35 9 0 0 0 3;
P message 260 549 20 196617 20;
P number 216 551 35 9 0 0 0 3;
P newex 216 532 74 196617 expr sqrt($i1);
P newex 396 257 29 196617 * −1;
P comment 654 −657 41 196617 9:00;
P number 748 −599 35 9 0 0 0 3;
P number 698 −596 35 9 0 0 0 3;
P newex 751 −619 23 196617 abs;
P newex 702 −616 23 196617 abs;
P number 751 −640 35 9 0 0 0 3;
P number 704 −636 35 9 0 0 0 3;
P newex 670 −580 134 196617 if $i1/2>=$i2 then set $i1;
P number 787 −559 35 9 0 0 0 3;
P number 690 −560 35 9 0 0 0 3;
P button 657 −477 15 0;
P newex 766 −495 27 196617 >;
P newex 755 −436 27 196617 &&;
P number 664 −518 35 9 0 0 0 3;
P number 710 −516 35 9 0 0 0 3;
P number 762 −516 35 9 0 0 0 3;
P number 712 −494 35 9 0 0 0 3;
P number 695 −451 35 9 0 0 0 3;
P number 764 −464 35 9 0 0 0 3;
P newex 682 −476 27 196617 >;
P newex 678 −499 27 196617/2;
P number 802 −517 35 9 0 0 0 3;
P newex 801 −495 27 196617/2;
P message 657 −443 14 196617 1;
P message 749 −389 14 196617 2;
P number 148 −422 92 36 0 0 0 3;
P inlet 783 469 15 0;
P inlet 780 428 15 0;
P comment 103 154 100 196617 Lydian=6;
P comment 348 −103 100 196617 Aoelean=10;
P comment 354 −146 100 196617 Mixolydian=8;
P comment 359 −127 100 196617 Dorian=9;
P comment 362 −170 100 196617 Phrygian=11;
P comment 362 −189 100 196617 Locrian=12;
P comment 62 101 100 196617 Ionian=7;
P comment 360 −206 100 196617 Pent I=1;
P comment 64 231 100 196617 Pent II=2;
P comment 57 260 100 196617 Pent III=3;
P comment 102 292 100 196617 Pent IV=4;
P comment 139 206 100 196617 Pent V=5;
P number 735 121 35 9 0 0 0 3;
P number 727 148 35 9 0 0 0 3;
P number 710 171 35 9 0 0 0 3;
P number 692 193 35 9 0 0 0 3;
P number 675 214 35 9 0 0 0 3;
P number 663 233 35 9 0 0 0 3;
P newex 502 −218 139 196617 select −1 −2 −4 −6 −7 −9 −11;
P newex 498 −165 145 196617 select −2 −4 −5 −7 −9 −11 −12;
P newex 482 −124 165 196617 select −2 −3 −5 −7 −9 −10 −12 −14;
P newex 492 −143 165 196617 select −2 −3 −5 −7 −8 −10 −12 −14;
P newex 501 −188 145 196617 select −2 −4 −6 −7 −9 −11 −12;
P newex 489 −100 165 196617 select −2 −4 −5 −7 −9 −10 −12 −14;
P number 325 41 35 9 0 0 0 3;
P button 578 −572 15 0;
P message 666 −539 14 196617 3;
P button 753 −411 15 0;
P comment −78 −55 41 196617 12:00;
P comment −60 117 41 196617 6:00;
P comment −67 96 41 196617 9:00;
P number 355 −302 35 9 0 0 0 3;
P number 312 −353 35 9 0 0 0 3;
P number 461 −353 35 9 0 0 0 3;
P newex 449 −291 27 196617 &&;
P number 427 −310 35 9 0 0 0 3;
P number 201 −360 35 9 0 0 0 3;
P number 265 −355 35 9 0 0 0 3;
P newex 333 −282 27 196617 &&;
P number 309 −303 35 9 0 0 0 3;
P number 266 −306 35 9 0 0 0 3;
P number 207 −305 35 9 0 0 0 3;
P newex 239 −282 27 196617 &&;
P newex 426 −331 29 196617==3;
P newex 355 −329 29 196617==2;
P newex 313 −329 29 196617 3;
P newex 206 −333 29 196617==3;
P newex 266 −331 29 196617==1;
P newex 464 −334 29 196617==3;
P number 468 −311 35 9 0 0 0 3;
P number 354 −351 35 9 0 0 0 3;
P number 422 −356 35 9 0 0 0 3;
P inlet 46 −313 15 0;
P number 189 −250 35 9 0 0 0 3;
P newex 797 −248 45 196617 gate;
P newex 797 −226 31 196617 gate;
P newex 798 −270 31 196617 gate;
P number 463 −211 35 9 0 0 0 3;
P number 462 −189 35 9 0 0 0 3;
P number 459 −169 35 9 0 0 0 3;
P number 751 −359 35 9 0 0 0 3;

```
#P number 713 -358 35 9 0 0 0 3;
#P number 664 -314 35 9 0 0 0 3;
#P newex 665 -335 29 196617==2;
#P newex 586 -331 29 196617==1;
#P newex 550 -333 29 196617==4;
#P newex 625 -334 29 196617==4;
#P newex 713 -342 29 196617==4;
#P newex 750 -341 29 196617==3;
#P newex 568 -287 27 196617 &&;
#P number 544 -309 35 9 0 0 0 3;
#P number 582 -310 35 9 0 0 0 3;
#P number 624 -309 35 9 0 0 0 3;
#P newex 647 -291 27 196617 &&;
#P number 586 -354 35 9 0 0 0 3;
#P number 544 -351 35 9 0 0 0 3;
#P number 744 -320 35 9 0 0 0 3;
#P newex 730 -299 27 196617 &&;
#P number 667 -353 35 9 0 0 0 3;
#P number 624 -353 35 9 0 0 0 3;
#P number 708 -320 35 9 0 0 0 3;
#P newex 800 -357 31 196617 gate;
#P newex 798 -310 31 196617 gate;
#P newex 796 -334 45 196617 gate;
#P number 445 -98 35 9 0 0 0 3;
#P number 449 -124 35 9 0 0 0 3;
#P number 460 -151 35 9 0 0 0 3;
#P newex 772 -46 45 196617 gate;
#P newex 789 -13 31 196617 gate;
#P newex 769 -95 31 196617 gate;
#P number 661 -16 35 9 0 0 0 3;
#P number 579 -54 35 9 0 0 0 3;
#P number 622 -54 35 9 0 0 0 3;
#P newex 780 -141 27 196617 &&;
#P number 701 -15 35 9 0 0 0 3;
#P number 499 -52 35 9 0 0 0 3;
#P number 541 -55 35 9 0 0 0 3;
#P newex 602 8 27 196617 &&;
#P number 579 -10 35 9 0 0 0 3;
#P number 537 -11 35 9 0 0 0 3;
#P number 499 -10 35 9 0 0 0 3;
#P newex 517 5 27 196617 &&;
#P newex 706 -40 29 196617==3;
#P newex 673 -43 29 196617==2;
#P newex 580 -35 29 196617==2;
#P newex 505 -34 29 196617==2;
#P newex 541 -32 29 196617==1;
#P newex 620 -36 29 196617==2;
#P number 619 -15 35 9 0 0 0 3;
#P number 673 -62 35 9 0 0 0 3;
#P number 715 -59 35 9 0 0 0 3;
#P newex 779 16 31 196617 gate;
#P newex 754 81 31 196617 gate;
#P newex 754 50 45 196617 gate;
#P number 211 56 35 9 0 0 0 3;
#P number 377 -53 35 9 0 0 0 3;
#P number 309 -52 35 9 0 0 0 3;
#P number 423 -12 35 9 0 0 0 3;
#P newex 419 -35 29 196617==3;
#P newex 219 -30 29 196617==1;
#P newex 161 -32 29 196617==1;
#P newex 268 -30 29 196617==1;
#P newex 310 -30 29 196617==2;
#P newex 381 -32 29 196617==1;
#P newex 194 17 27 196617 &&;
#P number 162 -6 35 9 0 0 0 3;
#P number 221 -7 35 9 0 0 0 3;
#P number 264 -4 35 9 0 0 0 3;
#P newex 288 17 27 196617 &&;
#P number 220 -56 35 9 0 0 0 3;
#P number 156 -61 35 9 0 0 0 3;
#P number 382 -11 35 9 0 0 0 3;
#P newex 402 7 27 196617 &&;
#P number 416 -54 35 9 0 0 0 3;
#P number 267 -54 35 9 0 0 0 3;
#P number 310 -3 35 9 0 0 0 3;
#P number -5 -126 92 36 0 0 0 3;
#P comment 96 32 100 196617 in from mode;
#P number 113 229 35 9 0 0 0 3;
#P number 102 256 35 9 0 0 0 3;
#P number 142 297 35 9 0 0 0 3;
#P number 178 207 35 9 0 0 0 3;
#P number 156 147 35 9 0 0 0 3;
#P number 105 88 35 9 0 0 0 3;
#P newex 181 144 165 196617 select -1 -3 -5 -6 -8 -10 -12 -14;
#P newex 194 239 159 196617 select -1 -2 -4 -6 -8 -9 -11 -13;
#P newex 204 263 159 196617 select -1 -3 -4 -6 -8 -9 -11 -13;
#P newex 241 212 165 196617 select -1 -3 -5 -6 -8 -10 -11 -13;
#P newex 173 105 165 196617 select -1 -3 -5 -7 -8 -10 -12 -14;
#P number 612 247 35 9 0 0 0 3;
#P number 604 265 35 9 0 0 0 3;
#P number 593 289 35 9 0 0 0 3;
#P number 568 312 35 9 0 0 0 3;
#P number 538 337 35 9 0 0 0 3;
#P number 500 353 35 9 0 0 0 3;
#P newex 228 361 165 196617 select -1 -3 -4 -6 -8 -10 -11 -13;
#P comment 256 -157 100 196617 note swap of mode order-->;
#P inlet -142 461 15 0;
#P outlet 899 361 15 0;
#P outlet 902 385 15 0;
#P outlet 906 408 15 0;
#P outlet 903 335 15 0;
#P outlet 901 313 15 0;
#P outlet 902 285 15 0;
#P outlet 905 132 15 0;
#P outlet 906 158 15 0;
#P outlet 906 182 15 0;
#P outlet 902 257 15 0;
```

```
#P outlet 904 230 15 0;
#P outlet 904 205 15 0;
#P comment 797 160 100 196617 DORIAN;
#P comment 798 183 100 196617 AOLEAN;
#P comment 797 208 100 196617 PHRYGIAN;
#P comment 797 233 100 196617 LOCRIAN;
#P comment 796 258 100 196617 PENT 1;
#P comment 795 284 100 196617 PENT 2;
#P comment 794 308 100 196617 PENT 3;
#P comment 792 335 100 196617 PENT 4;
#P comment 793 361 100 196617 PENT 5;
#P comment 793 386 100 196617 LYDIAN;
#P comment 800 410 100 196617 IONIAN;
#P comment 797 132 100 196617 MIXOLYDIAN;
#P comment 797 107 100 196617 BASIC;
#P connect 187 0 46 0;
#P connect 156 0 46 0;
#P connect 186 0 46 0;
#P connect 95 0 43 0;
#P connect 71 0 39 0;
#P connect 93 0 44 0;
#P connect 94 0 42 0;
#P connect 187 0 185 0;
#P connect 186 0 185 0;
#P connect 156 0 185 0;
#P connect 68 0 52 0;
#P connect 69 0 40 0;
#P connect 52 0 62 0;
#P connect 62 0 57 0;
#P connect 39 0 34 0;
#P connect 70 0 41 0;
#P connect 40 0 38 0;
#P connect 130 0 129 0;
#P connect 57 0 58 0;
#P connect 44 0 37 0;
#P connect 129 0 146 0;
#P connect 43 0 36 0;
#P connect 146 0 136 0;
#P connect 136 0 141 0;
#P connect 56 0 58 1;
#P connect 130 0 68 0;
#P connect 219 0 222 0;
#P connect 225 0 219 0;
#P connect 223 0 212 0;
#P connect 212 0 213 0;
#P connect 216 0 215 0;
#P connect 53 0 63 0;
#P connect 222 0 223 0;
#P connect 213 0 216 0;
#P connect 46 0 53 0;
#P connect 63 0 56 0;
#P connect 184 0 225 0;
#P connect 42 0 27 0;
#P connect 214 0 216 1;
#P connect 141 0 140 0;
#P connect 41 0 35 0;
#P connect 225 0 220 0;
#P connect 220 0 222 1;
#P connect 142 0 140 1;
#P connect 25 0 214 0;
#P connect 61 0 55 0;
#P connect 185 0 145 0;
#P connect 145 0 135 0;
#P connect 135 0 142 0;
#P connect 68 0 48 0;
#P connect 48 0 61 0;
#P connect 55 0 54 0;
#P connect 221 0 222 2;
#P connect 224 0 221 0;
#P connect 47 0 54 1;
#P connect 137 0 143 0;
#P connect 46 0 66 0;
#P connect 66 0 60 0;
#P connect 60 0 47 0;
#P connect 183 0 224 0;
#P connect 129 0 150 0;
#P connect 150 0 137 0;
#P connect 165 0 158 0;
#P connect 166 0 158 0;
#P connect 167 0 158 0;
#P connect 168 0 158 0;
#P connect 169 0 158 0;
#P connect 170 0 158 0;
#P connect 33 0 158 0;
#P connect 32 0 158 0;
#P connect 31 0 158 0;
#P connect 30 0 158 0;
#P connect 29 0 158 0;
#P connect 28 0 158 0;
#P connect 158 0 217 0;
#P connect 143 0 144 0;
#P connect 218 0 222 3;
#P connect 224 0 218 0;
#P connect 151 0 144 1;
#P connect 185 0 132 0;
#P connect 132 0 138 0;
#P connect 138 0 151 0;
#P connect 68 0 67 0;
#P connect 67 0 59 0;
#P connect 59 0 51 0;
#P connect 215 0 211 0;
#P connect 51 0 50 0;
#P connect 46 0 49 0;
#P connect 49 0 64 0;
#P connect 65 0 50 1;
#P connect 129 0 131 0;
#P connect 64 0 65 0;
#P connect 131 0 139 0;
#P connect 139 0 147 0;
#P connect 100 0 98 0;
#P connect 147 0 148 0;
#P connect 99 0 97 0;
```

P connect 127 0 123 0;
P connect 101 0 96 0;
P connect 185 0 149 0;
P connect 128 0 124 0;
P connect 126 0 125 0;
P connect 149 0 134 0;
P connect 133 0 148 1;
P connect 134 0 133 0;
P connect 97 0 162 0;
P connect 162 8 159 0;
P connect 98 0 159 0;
P connect 96 0 161 0;
P connect 123 0 163 0;
P connect 68 0 87 0;
P connect 77 0 82 0;
P connect 27 8 28 0;
P connect 124 0 160 0;
P connect 125 0 164 0;
P connect 87 0 77 0;
P connect 82 0 81 0;
P connect 83 0 81 1;
P connect 76 0 83 0;
P connect 36 8 29 0;
P connect 46 0 86 0;
P connect 86 0 76 0;
P connect 129 0 107 0;
P connect 117 0 112 0;
P connect 107 0 117 0;
P connect 112 0 113 0;
P connect 37 8 30 0;
P connect 203 0 157 0;
P connect 68 0 91 0;
P connect 78 0 84 0;
P connect 91 0 78 0;
P connect 118 0 111 0;
P connect 111 0 113 1;
P connect 185 0 108 0;
P connect 108 0 118 0;
P connect 35 8 31 0;
P connect 84 0 85 0;
P connect 38 8 32 0;
P connect 34 8 33 0;
P connect 75 0 74 0;
P connect 74 0 85 1;
P connect 90 0 75 0;
P connect 46 0 90 0;
P connect 129 0 103 0;
P connect 116 0 110 0;
P connect 103 0 116 0;
P connect 110 0 109 0;
P connect 239 0 200 0;
P connect 200 0 187 0;
P connect 79 0 92 0;
P connect 159 8 165 0;
P connect 206 0 197 0;
P connect 119 0 120 0;

P connect 120 0 109 1;
P connect 104 0 119 0;
P connect 157 0 156 0;
P connect 185 0 104 0;
P connect 208 0 203 0;
P connect 68 0 73 0;
P connect 73 0 79 0;
P connect 162 8 166 0;
P connect 197 0 190 0;
P connect 196 0 191 0;
P connect 206 0 201 0;
P connect 201 0 239 0;
P connect 161 8 167 0;
P connect 191 0 193 0;
P connect 206 0 208 0;
P connect 190 0 191 1;
P connect 80 0 88 0;
P connect 204 0 206 0;
P connect 227 0 204 0;
P connect 72 0 80 0;
P connect 115 0 102 0;
P connect 207 0 196 0;
P connect 163 7 168 0;
P connect 188 0 194 0;
P connect 129 0 121 0;
P connect 121 0 115 0;
P connect 46 0 72 0;
P connect 160 7 169 0;
P connect 102 0 105 0;
P connect 164 7 170 0;
P connect 114 0 106 0;
P connect 106 0 105 1;
P connect 207 0 209 0;
P connect 155 0 186 0;
P connect 122 0 114 0;
P connect 226 0 205 0;
P connect 205 0 207 0;
P connect 185 0 122 0;
P connect 198 0 155 0;
P connect 54 0 69 0;
P connect 50 0 70 0;
P connect 193 0 198 0;
P connect 206 0 195 0;
P connect 199 0 192 0;
P connect 195 0 199 0;
P connect 81 0 93 0;
P connect 192 0 198 1;
P connect 85 0 95 0;
P connect 211 0 70 1;
P connect 58 0 71 0;
P connect 92 0 89 0;
P connect 194 0 199 1;
P connect 207 0 202 0;
P connect 89 0 94 0;
P connect 211 0 69 1;
P connect 211 0 93 1;

P connect 209 0 203 1;
P connect 109 0 99 0;
P connect 144 0 128 0;
P connect 148 0 127 0;
P connect 88 0 89 1;
P connect 105 0 100 0;
P connect 140 0 126 0;
P connect 113 0 101 0;
P connect 211 0 71 1;
P connect 189 0 188 0;
P connect 207 0 189 0;
P connect 211 0 95 1;
P connect 211 0 94 1;
P connect 202 0 239 1;
P connect 211 0 127 1;
P connect 211 0 100 1;
P connect 211 0 126 1;
P connect 211 0 101 1;
P connect 211 0 99 1;
P connect 211 0 128 1;
P connect 35 8 24 0;
P connect 36 8 20 0;
P connect 164 7 15 0;
P connect 37 8 19 0;
P connect 38 8 23 0;
P connect 27 8 21 0;
P connect 163 7 13 0;
P connect 160 7 14 0;
P connect 161 8 18 0;
P connect 162 8 17 0;
P connect 159 8 16 0;
P connect 34 8 22 0;
P pop;
P hidden newobj 115 150 212 196617 patcher Pythag;
P hidden number 356 180 35 9 0 0 0 3;
P number 50 24 35 9 0 0 0 3;
P number 14 26 35 9 0 0 0 3;
P hidden newex 668 96 35 196617 metro;
P hidden comment 527 177 100 196617 mouse coordinates;
P comment 72 166 100 196617 start;
P hidden comment 722 100 100 196617 Metrodome Pulse For Tracking Mouse;
P message 520 58 37 196617 reset;
P hidden newex 575 106 69 196617 MouseState;
P hidden message 785 78 26 196617 512;
P hidden message 747 80 26 196617 256;
P hidden message 720 81 14 196617 5;
P hidden message 572 52 24 196617 poll;
P hidden message 605 58 34 196617 nopoll;
P toggle 95 153 15 0;
N vpatcher 9 51 638 478;
P comment 479 607 100 196617 out to Pythagoras;
P comment 665 252 100 196617 Divide ball into four parts;
P comment 406 103 30 196617 Y;
P comment 152 105 24 196617 X;
P comment 226 97 100 196617 Inlet;
P inlet 367 103 15 0;
P number 68 243 35 9 0 0 0 3;
P inlet 191 103 15 0;
P number 147 245 35 9 0 0 0 3;
P message 113 244 14 196617 0;
P message 191 246 14 196617 0;
P newex −140 541 27 196617 gate;
P newex 140 322 27 196617 &&;
P newex 175 268 27 196617<=;
P newex 95 267 27 196617<=;
P number 94 293 35 9 0 0 0 3;
P number 178 290 35 9 0 0 0 3;
P number 144 355 35 9 0 0 0 3;
P number 286 357 35 9 0 0 0 3;
P number 243 296 35 9 0 0 0 3;
P newex 244 270 27 196617<=;
P newex 284 323 27 196617 &&;
P message 340 249 14 196617 0;
P message 262 247 14 196617 0;
P number 296 248 35 9 0 0 0 3;
P number 217 246 35 9 0 0 0 3;
P number 429 366 35 9 0 0 0 3;
P number 473 293 35 9 0 0 0 3;
P number 396 298 35 9 0 0 0 3;
P newex 474 270 27 196617<=;
P newex 434 323 27 196617 &&;
P message 490 248 14 196617 0;
P message 412 241 14 196617 0;
P number 446 247 35 9 0 0 0 3;
P number 367 245 35 9 0 0 0 3;
P number 586 349 35 9 0 0 0 3;
P number 624 296 35 9 0 0 0 3;
P number 544 298 35 9 0 0 0 3;
P newex 586 321 27 196617 &&;
P message 641 251 14 196617 0;
P message 563 249 14 196617 0;
P number 597 250 35 9 0 0 0 3;
P number 518 248 35 9 0 0 0 3;
P newex 543 271 27 196617>=;
P newex 631 272 27 196617>=;
P newex 394 272 27 196617>=;
P newex 317 270 27 196617>=;
P number 317 297 35 9 0 0 0 3;
P comment 94 351 41 196617 9:00;
P comment 538 352 41 196617 3:00;
P comment 233 355 41 196617 6:00;
P comment 384 353 41 196617 12:00;
P message 241 413 14 196617 2;
P message 344 417 14 196617 1;
P message 472 414 14 196617 3;
P message 658 399 14 196617 4;
P comment 665 440 100 196617 any message in right is sent to outlet if gate is open \, ignored otherwise.;
P number 206 486 35 9 0 0 0 3;
P newex 191 447 31 196617 gate;
P number 325 488 35 9 0 0 0 3;

```
#P newex 324 463 31 196617 gate;
#P number 457 482 35 9 0 0 0 3;
#P newex 440 440 31 196617 gate;
#P number 609 477 35 9 0 0 0 3;
#P newex 605 450 31 196617 gate;
#P number 329 533 35 9 0 0 0 3;
#P outlet 461 606 15 0;
#P button 421 418 15 0;
#P button 542 420 15 0;
#P connect 61 0 62 0;
#P connect 54 0 53 0;
#P connect 62 0 54 0;
#P connect 59 0 54 1;
#P connect 53 0 56 0;
#P connect 56 0 51 0;
#P connect 63 0 60 0;
#P connect 52 0 56 1;
#P connect 60 0 55 0;
#P connect 55 0 52 0;
#P connect 56 0 10 0;
#P connect 58 0 55 1;
#P connect 10 0 11 0;
#P connect 16 0 10 1;
#P connect 61 0 43 0;
#P connect 56 0 16 0;
#P connect 48 0 49 0;
#P connect 43 0 48 0;
#P connect 45 0 48 1;
#P connect 49 0 47 0;
#P connect 47 0 50 0;
#P connect 63 0 44 0;
#P connect 21 0 47 1;
#P connect 44 0 22 0;
#P connect 22 0 21 0;
#P connect 47 0 8 0;
#P connect 8 0 9 0;
#P connect 4 0 3 0;
#P connect 6 0 3 0;
#P connect 10 0 3 0;
#P connect 8 0 3 0;
#P connect 46 0 22 1;
#P connect 47 0 15 0;
#P connect 15 0 8 1;
#P connect 61 0 34 0;
#P connect 34 0 23 0;
#P connect 23 0 40 0;
#P connect 36 0 23 1;
#P connect 38 0 42 0;
#P connect 40 0 38 0;
#P connect 38 0 6 0;
#P connect 63 0 35 0;
#P connect 41 0 38 1;
#P connect 6 0 7 0;
#P connect 14 0 6 1;
#P connect 3 0 2 0;
#P connect 38 0 14 0;
#P connect 39 0 41 0;
#P connect 35 0 39 0;
#P connect 37 0 39 1;
#P connect 61 0 26 0;
#P connect 26 0 25 0;
#P connect 25 0 31 0;
#P connect 28 0 25 1;
#P connect 31 0 30 0;
#P connect 30 0 33 0;
#P connect 63 0 27 0;
#P connect 32 0 30 1;
#P connect 30 0 4 0;
#P connect 33 0 4 0;
#P connect 4 0 5 0;
#P connect 24 0 32 0;
#P connect 13 0 4 1;
#P connect 27 0 24 0;
#P connect 29 0 24 1;
#P connect 30 0 13 0;
#P pop;
#P hidden newobj −17 207 90 196617 patcher Quadrants;
#P hidden button −37 779 15 0;
#P hidden button −37 758 15 0;
#P hidden button −38 733 15 0;
#P hidden button −39 704 15 0;
#P hidden button −38 676 15 0;
#P hidden button −38 655 15 0;
#P hidden button −36 628 15 0;
#P hidden button −33 600 15 0;
#P hidden button −36 574 15 0;
#P hidden button −35 556 15 0;
#P hidden button −36 529 15 0;
#P hidden button −36 504 15 0;
#P hidden comment −14 478 100 196617 BASIC;
#P hidden comment −14 503 100 196617 MIXOLYDIAN;
#P hidden comment −11 781 100 196617 IONIAN;
#P hidden comment −15 759 100 196617 LYDIAN;
#P hidden comment −18 732 100 196617 PENT 5;
#P hidden comment −19 706 100 196617 PENT 4;
#P hidden comment −17 679 100 196617 PENT 3;
#P hidden comment −16 655 100 196617 PENT 2;
#P hidden comment −15 629 100 196617 PENT 1;
#P hidden comment −14 604 100 196617 LOCRIAN;
#P hidden comment −14 579 100 196617 PHRYGIAN;
#P hidden comment −13 554 100 196617 AOLEAN;
#P hidden comment −14 531 100 196617 DORIAN;
#P hidden message 89 573 43 196617 next 80;
#P hidden message 89 524 43 196617 next 40;
#P hidden message 96 628 49 196617 next 120;
#P hidden message 87 676 49 196617 next 160;
#P hidden message 90 706 49 196617 next 180;
#P hidden message 90 730 49 196617 next 200;
#P hidden message 92 758 49 196617 next 220;
#P hidden message 95 595 49 196617 next 100;
#P hidden message 93 550 43 196617 next 60;
#P hidden message 93 649 49 196617 next 140;
```

P hidden message 93 779 49 196617 next 240;
P hidden message 92 501 43 196617 next 20;
P hidden message 112 348 47 196617 border 0;
P hidden message 216 101 14 196617 0;
P message 34 364 28 196617 read;
P hidden message 163 186 25 196617 pict;
P hidden inlet −42 315 15 0;
P comment 1 42 100 196617 X Y coordinates;
P comment 24 384 100 196617 read quicktime movie;
P hidden comment 1 317 100 196617 ragzbol midi out;
P user imovie 379 86 511 510 0;
M rd 'Ragzbol Text.MOV copy';
M rd 'Ragzbol Text.MOV';
M rd Ragzbol.MOV;
M rd 'Ragzbol Text.MOV copy';
P hidden connect 72 9 42 0;
P hidden connect 72 7 40 0;
P hidden connect 72 8 41 0;
P hidden connect 72 10 43 0;
P hidden connect 72 11 44 0;
P hidden connect 72 12 45 0;
P hidden connect 72 1 34 0;
P hidden connect 72 2 35 0;
P hidden connect 72 4 37 0;
P hidden connect 72 6 39 0;
P hidden connect 72 3 36 0;
P hidden connect 75 0 72 0;
P hidden connect 71 0 72 0;
P hidden connect 72 5 38 0;
P hidden connect 72 0 73 0;
P hidden connect 59 0 46 0;
P hidden connect 63 0 64 0;
P hidden connect 62 0 66 0;
P hidden connect 66 0 69 0;
P hidden connect 70 0 69 0;
P hidden connect 68 0 63 0;
P hidden connect 62 0 68 0;
P hidden connect 53 1 59 0;
P hidden connect 76 0 71 0;
P hidden connect 65 0 70 0;
P hidden connect 53 2 60 0;
P hidden connect 69 0 67 0;
P hidden connect 60 0 46 1;
P hidden connect 41 0 17 0;
P hidden connect 35 0 19 0;
P hidden connect 37 0 20 0;
P hidden connect 42 0 16 0;
P hidden connect 43 0 15 0;
P hidden connect 34 0 9 0;
P hidden connect 44 0 14 0;
P hidden connect 36 0 12 0;
P hidden connect 40 0 11 0;
P hidden connect 45 0 10 0;
P hidden connect 38 0 13 0;
P hidden connect 39 0 18 0;
P hidden connect 47 0 62 0;
P hidden connect 77 0 71 1;
P hidden connect 74 0 75 0;
P connect 78 0 79 0;
P hidden connect 61 0 62 1;
P hidden connect 59 0 62 2;
P hidden connect 34 0 7 0;
P hidden connect 35 0 7 0;
P hidden connect 36 0 7 0;
P hidden connect 37 0 7 0;
P hidden connect 38 0 7 0;
P hidden connect 39 0 7 0;
P hidden connect 40 0 7 0;
P hidden connect 41 0 7 0;
P hidden connect 42 0 7 0;
P hidden connect 43 0 7 0;
P hidden connect 44 0 7 0;
P hidden connect 45 0 7 0;
P hidden connect 73 0 7 0;
P hidden connect 60 0 62 3;
P hidden connect 60 0 62 4;
P hidden connect 59 0 62 5;
P hidden connect 46 0 61 0;
P hidden fasten 7 0 0 0 221 535 150 535 150 471 384 471;
P hidden fasten 6 0 0 0 39 493 150 493 150 471 384 471;
P hidden connect 8 0 0 0;
P hidden connect 12 0 0 0;
P hidden connect 9 0 0 0;
P hidden connect 19 0 0 0;
P hidden connect 20 0 0 0;
P hidden connect 13 0 0 0;
P hidden connect 18 0 0 0;
P hidden connect 11 0 0 0;
P hidden connect 17 0 0 0;
P hidden connect 16 0 0 0;
P hidden connect 15 0 0 0;
P hidden connect 14 0 0 0;
P hidden connect 10 0 0 0;
P hidden connect 54 0 53 0;
P hidden connect 49 0 53 0;
P hidden connect 48 0 53 0;
P hidden connect 58 0 53 0;
P hidden connect 78 0 53 0;
P hidden connect 47 0 58 0;
P hidden connect 52 0 58 1;
P hidden connect 51 0 58 1;
P hidden connect 50 0 58 1;
P pop;

The above computer code is merely an example. There should be many alternatives, variations, and modifications, which can be used. The code should merely be used to show that certain aspects of the invention can be easily implemented on conventional hardware. One of ordinary skill in the art would recognize many other ways of implementing the inventions further described in the claims herein.

While the above is a full description of the specific embodiments, various modifications, alternative constructions and equivalents may be used. For example, specific dimensions are discussed above for the specific embodiments. But of course, these dimensions may depend on the particular application. Additionally, the above invention is described generally in terms of ball-like or round structures. It would be possible to implement the present invention using other geometric shapes such as a polygon, a linear arrangement, and others. Furthermore, the invention described above can be implemented on paper, a computer display, a palm top device, a lap top device, a game, and many other media. Therefore, the above description and illustrations should not be taken as limiting the scope of the present invention which is defined by the appended claims.

What is claimed is:

1. A system for forming music comprising a user interface on a display, said user interface comprising:
   a first portion on said display comprising a plurality of inputs;
   a second portion on said display comprising a patterned output, said patterned output being representative to said inputs and visually displaying patterns associated with resulting music;
   wherein said plurality of user inputs are provided in rows, said rows comprising a first row comprising a plurality of tempo balls through which a tempo or a plurality of tempos can be entered.

2. The system of claim 1 wherein one of said inputs is selected from a tempo, a key, a register, and a structure.

3. The system of claim 1 wherein said patterned output is operably coupled to one or more of said plurality of inputs.

4. The system of claim 1 further comprising on said display a start/stop icon, a reverse icon, and a forward icon, all of which control the playing of the resulting music.

5. The system of claim 1 wherein said second portion on said display comprises a pallet region, where icons representing music characteristics are placed.

6. The system of claim 5 wherein said pallet region is outside of said patterned output being situated in said second portion.

7. The system of claim 1 wherein said rows further comprise:
   a second row comprising a plurality of key balls through which a note or a plurality of notes can be entered;
   a third row comprising a plurality of register balls through which a pitch or a plurality of pitches can be entered;
   a fourth row comprising a structure ball through which a harmonic portion of music or a plurality of harmonic portions of music can be entered; and
   a fifth row comprising a groove ball through which a basic rhythm or a plurality of basic rhythms can be entered.

8. A method for forming music on a computer, said method comprising:
   providing a user display, said user display comprising a first portion, said first portion comprising one or more indications which define music characteristics, wherein said indications are provided in rows, said rows comprising a first row comprising a plurality of tempo balls through which a tempo or a plurality of tempos can be entered;
   selecting one of said indications that corresponds to one of said music characteristics; and
   placing said selected indication on a second portion of said user display to form a patterned output, said patterned output being representative to said selected indication and visually displaying patterns associated with resulting music;
   wherein said selecting and placing corresponds to clicking, dragging, and dropping said selected indication.

9. The method of claim 8 wherein said rows further comprise:
   a second row comprising a plurality of key balls through which a note or a plurality of notes can be entered;
   a third row comprising a plurality of register balls through which a pitch or a plurality of pitches can be entered;
   a fourth row comprising a structure ball through which a harmonic portion of music or a plurality of harmonic portions of music can be entered; and
   a fifth row comprising a groove ball through which a basic rhythm or a plurality of basic rhythms can be entered.

10. The method of claim 8 wherein said selected information comprises an icon that is shaped as a ball.

11. The method of claim 8 wherein said method is provided on a personal computer.

12. The method of claim 11 wherein said personal computer comprises at least a PENTIUM™ based microprocessor.

13. A system for creating music, said system comprising a microprocessor based sub-system and memory coupled to said microprocessor based sub-system, said memory comprising:
   a first code directed to displaying one or more indications on a first display portion, said one or more indications defining music characteristics; and
   a second code directed to selecting one of said indications that corresponds to one of said music characteristics;
   a third code directed to placing said selected indication on a second portion of a display to form a patterned output, said patterned output being representative to said selected indication and visually displaying patterns associated with resulting music; and
   a fourth code directed to providing said indications in rows in said first display portion, the rows comprising a first row of tempo balls through which a tempo or a plurality of tempos can be entered.

14. The system of claim 13 wherein said rows further comprise:
   a second row comprising a plurality of key balls through which a note or a plurality of notes can be entered;
   a third row comprising a plurality of register balls through which a pitch or a plurality of pitches can be entered;
   a fourth row comprising a structure ball through which a harmonic portion of music or a plurality of hannonic portions of music can be entered; and
   a fifth row comprising a groove ball through which a basic rhythm or a plurality of basic rhythms can be entered.

15. The system of claim 13 wherein said selected indication comprises an icon that is shaped as a ball, said icon being placed on said second portion.

16. The system of claim 13 wherein said system is a personal computer.

17. The system of claim 16 wherein said personal computer comprises at least a PENTIUM™ based microprocessor.

* * * * *